United States Patent
Korchev et al.

(10) Patent No.: US 10,732,277 B2
(45) Date of Patent: Aug. 4, 2020

(54) METHODS AND SYSTEMS FOR MODEL BASED AUTOMATIC TARGET RECOGNITION IN SAR DATA

(71) Applicant: THE BOEING COMPANY, Chicago, IL (US)

(72) Inventors: Dmitriy V. Korchev, Irvine, CA (US); Yuri Owechko, Newbury Park, CA (US); Mark A. Curry, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 861 days.

(21) Appl. No.: 15/141,905

(22) Filed: Apr. 29, 2016

(65) Prior Publication Data
US 2017/0350974 A1 Dec. 7, 2017

(51) Int. Cl.
G01S 13/90 (2006.01)
G01S 7/41 (2006.01)

(52) U.S. Cl.
CPC ............ *G01S 13/904* (2019.05); *G01S 7/412* (2013.01)

(58) Field of Classification Search
None
See application file for complete search history.

(56) References Cited

U.S. PATENT DOCUMENTS

| | | | |
|---|---|---|---|
| 6,756,934 B1* | 6/2004 | Chen | G01S 7/412 342/89 |
| 9,086,484 B2 | 7/2015 | Medasani et al. | |
| 2006/0273946 A1* | 12/2006 | Krikorian | G01S 13/90 342/25 A |
| 2008/0162389 A1* | 7/2008 | Aboutalib | G06K 9/3241 706/15 |
| 2010/0177095 A1* | 7/2010 | Watkins | G06T 15/60 345/426 |
| 2011/0299733 A1* | 12/2011 | Jahangir | G01S 13/9023 382/103 |
| 2013/0004017 A1* | 1/2013 | Medasani | G01S 7/412 382/103 |
| 2015/0347871 A1* | 12/2015 | Sathyendra | G06K 9/6267 382/103 |

(Continued)

OTHER PUBLICATIONS

Scott Papson, Ram Narayanan; article entitled Modeling of Target Shadows for SAR Image Classification; 35th Applied Imagery and Pattern Recognition Workshop (AIPR '06);Publisher—IEEE; Oct. 11, 2006 Oct. 11, 2006.

(Continued)

*Primary Examiner* — Vladimir Magloire
*Assistant Examiner* — Donald H B Braswell
(74) *Attorney, Agent, or Firm* — Coats & Bennett, PLLC

(57) ABSTRACT

A method for automatic target recognition in synthetic aperture radar (SAR) data, comprising: capturing a real SAR image of a potential target at a real aspect angle and a real grazing angle; generating a synthetic SAR image of the potential target by inputting, from a potential target database, at least one three-dimensional potential target model at the real aspect angle and the real grazing angle into a SAR regression renderer; and, classifying the potential target with a target label by comparing at least a portion of the synthetic SAR image with a corresponding portion of the real SAR image using a processor.

30 Claims, 33 Drawing Sheets

(56) References Cited

U.S. PATENT DOCUMENTS

2015/0371431 A1* 12/2015 Korb .................. G06T 9/00
                                                    382/113
2017/0059702 A1*  3/2017 Stevens ............... G01S 13/90

OTHER PUBLICATIONS

Webpage Expectation Maximization; from http://docs.opencv.org/2.4/modules/ml/doc/expectation_maximization.html; pp. 1-6; Feb. 18, 2016 Feb. 18, 2016.

Samuel W. (Walt) McCandless, Jr and Christoper R. Jackson; article entitled Chapter 1. Principles of Synthetic Aperture Radar; SAR Marine User's Manual; Principles of Synthetic Aperture Radar; pp. 1-23; Sep. 2004 Sep. 1, 2004.

Gary Bradski and Adrian Kaehler; Book entitled Learning Open CV; ISBN: 978-0-596-51613-0; -571 pages; Sep. 2008 Sep. 1, 2008.

Tan Hwee Pink; Umaiyal Ramanathan; Article entitled Extraction of Height Information From Target Shadow for Applications in ATC; Publisher—IEEE; pp. 351-353; 1999.

* cited by examiner

SHIFT ±n positions

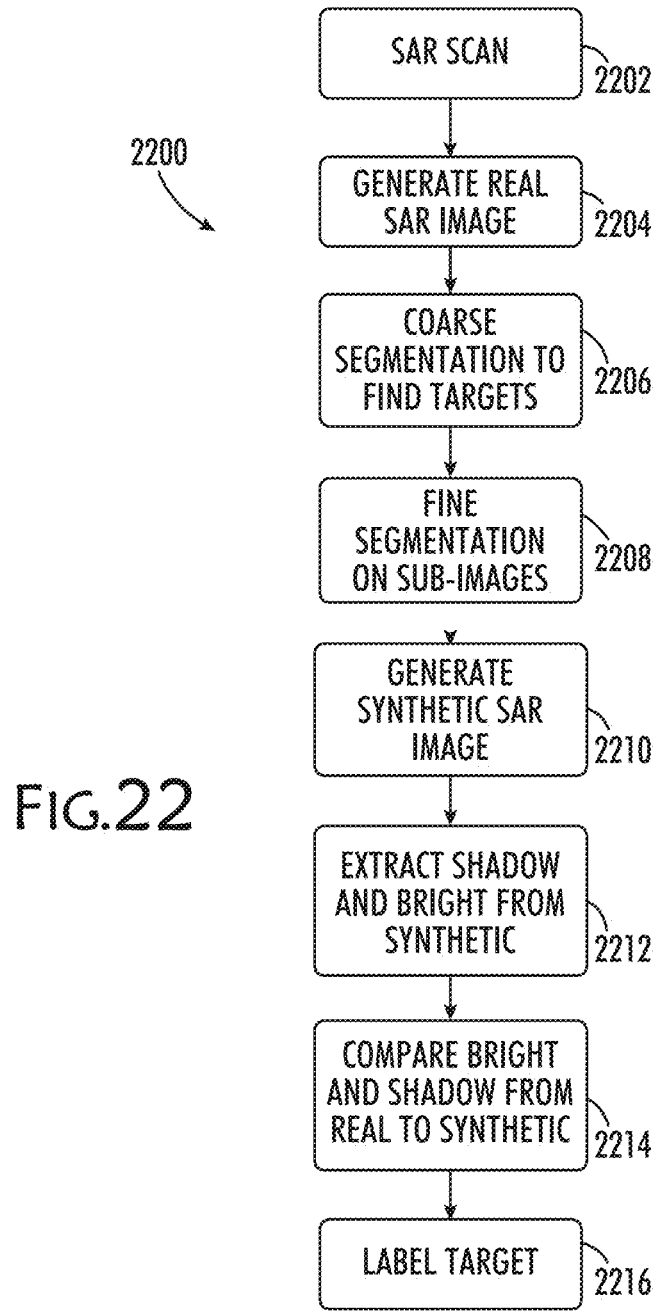

METHODS AND SYSTEMS FOR MODEL BASED AUTOMATIC TARGET RECOGNITION IN SAR DATA

FIELD

The present disclosure generally relates to the field of synthetic aperture radar ("SAR"). More particularly, the present disclosure relates to the field of target recognition in SAR data.

BACKGROUND

Traditionally, rendering SAR images requires, at the very least, big memory storage when a SAR renderer is used to generate all variety of target images. The severe hardware requirements necessitate processing to be performed off-line or not in real time. Predicting SAR images from CAD models is a very complex problem that cannot be addressed correctly by applying rendering techniques developed for simulation of optical images. Specialized software packages available in the industry for performing this processing, like Xpatch by Leidos, Inc., are very complex to learn and take significant time to run. In addition, they require high fidelity CAD models with accurate settings of electromagnetic properties of all parts of the CAD models being utilized, further exacerbating the already demanding hardware requirements.

To enhance understanding of the disclosure herein, various basic principles of SAR are presented. FIG. 1 shows the SAR viewing geometry and the relations between slant samples 102i, 102ii on a slant plane 102 and ground samples 104i, 104ii on a ground plane 104. The sample spacing on the slant and ground planes are related via a function of the SAR's grazing angle iv, which is defined as the angle between the radar line of sight and the local tangent plane at the point of the reflection of the earth. Typically, the SAR image is first formed on the slant plane 102 and then projected to the ground plane 104 with the corresponding resampling as needed.

Additional principles of SAR are presented in McCandless, S. W. and Jackson, C. R., "Principles of Synthetic Aperture Radar", Chapter 1 of *SAR Marine User's Manual*, NOAA, 2004.

Other background references include: U.S. patent application Ser. No. 13/173,891; Papson, Scott and Narayanan, Ram, "Modeling of Target Shadows for SAR Image Classification", 35$^{th}$ Applied Imagery and Pattern Recognition Workshop (AIPR '06); "Expectation Maximization", docs.opencv.org/modules/ml/doc/expectation_maximization.html; Bradski, Gary and Kaehler, Adrian, *Learning OpenCV: Computer Vision with the OpenCV Library*, O'Reilly Media, 2008; Pink, Tan Hwee and Ramanathan, U., "Extraction of height information from target shadow for applications in ATC", Geoscience and Remote Sensing Symposium, 1999, the disclosures of which are incorporated herein in their entireties.

BRIEF SUMMARY

An aspect of the disclosure relates to a method for automatic target recognition in synthetic aperture radar (SAR) data, comprising: capturing a real SAR image of a potential target at a real aspect angle and a real grazing angle; generating a synthetic SAR image of the potential target by inputting, from a potential target database, at least one three-dimensional potential target model at the real aspect angle and the real grazing angle into a SAR regression renderer; and, classifying the potential target with a target label by comparing at least a portion of the synthetic SAR image with a corresponding portion of the real SAR image using a processor.

In an aspect, the method further comprises segmenting the synthetic SAR image and the real SAR image before classifying and wherein the comparing is performed on at least one segment of the synthetic SAR image corresponding to at least one segment of the real SAR image.

In an aspect, the synthetic SAR image and the real SAR image are each correspondingly segmented into at least one shadow area.

In an aspect, the method further comprises extracting a far edge of each of the corresponding at least one shadow areas.

In an aspect, the classifying compares a far edge of the synthetic SAR image shadow area to a corresponding far edge of the real SAR image shadow area.

In an aspect, the synthetic SAR image and the real SAR image are each correspondingly segmented into at least one bright area and at least one shadow area.

In an aspect, the classifying includes comparing, at the same aspect and grazing angles, a plurality of models from the potential target database to the real SAR image and choosing a best match from the plurality of models.

In an aspect, geolocation is used in addition to aspect angle and grazing angle in the capturing and generating.

In an aspect, the at least one-three dimensional potential target model also includes material information.

In an aspect, at least one of the generating and the classifying is performed in parallel by a plurality of SAR regression renderers and processors, respectively.

In an aspect, the at least one three-dimensional potential target model is a model of at least one of a tank, an armored car, a car, a truck, an artillery piece, a vehicle, and a boat.

In an aspect, at least one of capturing, generating and classifying are repeated for target label verification.

An aspect of the disclosure relates to a method for automatic target recognition in maritime-derived synthetic aperture radar (SAR) data, comprising: capturing a real cross-range projection SAR image of a potential maritime target at a real grazing angle and a real aspect angle; generating a first synthetic cross-range projection SAR image of the potential maritime target by inputting, from a potential target database, at least one three-dimensional potential target model at the real grazing angle and the real aspect angle into a SAR regression renderer; generating a second synthetic cross-range projection SAR image of the potential maritime target by inputting, from a potential target database, the at least one three-dimensional potential target model at the real grazing angle and a second aspect angle into a SAR regression renderer; and, classifying the potential target with a target label by comparing at least a portion of the real cross-range projection SAR image with a corresponding portion of the first synthetic cross-range projection SAR image and the second synthetic cross-range projection SAR image using a processor.

In an aspect, the method further comprises segmenting the real cross-range projection SAR image with a segmentation module.

In an aspect, the method further comprises extracting a binary mask from the segmented real cross-range projection SAR image.

In an aspect, the segmentation module determines the real aspect angle and the second aspect angle from the real cross-range projection SAR image for input into the SAR regression renderer.

In an aspect, the first synthetic cross-range projection SAR image and the second synthetic cross-range projection SAR image is compared with the real cross-range projection SAR image to adjust for ambiguity of target aspect angle estimation in maritime-derived SAR data.

In an aspect, the target label includes a specific maritime target ship class.

An aspect of the disclosure relates to a method for automatic target recognition in synthetic aperture radar (SAR) data, comprising: capturing a real cross-range projection SAR image of a potential target at a real grazing angle and a real aspect angle; generating a first synthetic cross-range projection SAR image of the potential target by inputting, from a potential target database, at least one three-dimensional potential target model at the real grazing angle and the real aspect angle into a SAR regression renderer; generating a second synthetic cross-range projection SAR image of the potential target by inputting, from a potential target database, the at least one three-dimensional potential target model at the real grazing angle and a second aspect angle into a SAR regression renderer; and, classifying the potential target with a target label by comparing at least a portion of the real cross-range projection SAR image with a corresponding portion of the first synthetic cross-range projection SAR image and the second synthetic cross-range projection SAR image using a processor.

In an aspect, at least one of capturing, generating a first projection, generating a second projection and classifying are repeated for target label verification.

An aspect of the disclosure relates to a system for automatic target recognition in synthetic aperture radar (SAR) data, comprising: a synthetic aperture radar configured to generate a real SAR image of a potential target at a real aspect angle and a real grazing angle; a database containing at least one three dimensional model of a potential target of interest; a SAR regression renderer configured to generate a synthetic SAR image using the at least one three dimensional model at the real aspect angle and the real grazing angle; and, a processor configured to compare at least a portion of the synthetic SAR image with a corresponding portion of the real SAR image to classify the potential target with a target label.

In an aspect, the system further comprises a segmentation module configured to segment at least a portion of at least one of the synthetic SAR image and the real SAR image.

In an aspect, the segmentation module is configured to segment at least a corresponding portion of the synthetic SAR image and the real SAR image into a shadow area.

In an aspect, the system further comprises a module for extracting a far edge of the shadow area for the synthetic SAR image and the real SAR image.

In an aspect, the segmentation module is further configured to segment at least a corresponding portion of the synthetic SAR image and the real SAR image into a bright area.

In an aspect, the SAR regression renderer is configured to generate a plurality of synthetic SAR images using a plurality of three dimensional models for comparison to the real SAR image.

In an aspect, the system further comprises a best match analysis module configured to analyze the comparison to identify which synthetic SAR image is the best match to the real SAR image.

In an aspect, the synthetic aperture radar is configured to communicate geolocation to the system.

In an aspect, the at least one three dimensional model of a potential target of interest includes material information.

An aspect of the disclosure relates to a system for automatic target recognition in synthetic aperture radar (SAR) data, comprising: a platform; a synthetic aperture radar mounted on the platform and configured to generate a real SAR image of a potential target at a real aspect angle and a real grazing angle; a database containing at least one three dimensional model of a potential target of interest; a SAR regression renderer configured to generate a synthetic SAR image using the at least one three dimensional model at the real aspect angle and the real grazing angle; and, a processor configured to compare at least a portion of the synthetic SAR image with a corresponding portion of the real SAR image to classify the potential target with a target label.

In an aspect, the platform is selected from the group consisting of: a manned aircraft; an unmanned aircraft; a manned spacecraft; an unmanned spacecraft; a manned rotorcraft; an unmanned rotorcraft; ordnance, and combinations thereof.

Unless otherwise defined, all technical and/or scientific terms used herein have the same meaning as commonly understood by one of ordinary skill in the art to which the disclosed aspects pertain. Although methods and materials similar or equivalent to those described herein can be used in the practice or testing of aspects, exemplary methods and/or materials are described below. In case of conflict, the patent specification, including definitions, will control.

In addition, the components, materials, methods, and examples are illustrative only and are not intended to be necessarily limiting.

Implementation of the method and/or system of aspects of the disclosed aspects can involve performing or completing selected tasks manually, automatically, or a combination thereof. Moreover, according to actual instrumentation and equipment of aspects of the method and/or system of the application, several selected tasks could be implemented by hardware, by software or by firmware or by any combination thereof, using for instance an operating system.

For example, hardware for performing selected tasks according to disclosed aspects may include a chip and/or a circuit. As software, selected tasks according to disclosed aspects could be implemented as a plurality of software instructions being executed by a computer using any suitable operating system. In an aspect, one or more tasks that may be associated with aspects of the method and/or system as described herein may be performed by a processor or module, such as a computing platform for executing the plurality of instructions. Optionally, the processor/module includes and/or is operatively coupled with a volatile memory for storing instructions and/or data, and/or a non-volatile storage, for example, a magnetic hard-disk and/or removable media, for storing instructions and/or data. Optionally, a network connection is provided as well. An output device, for example, a display, and/or a user input device, for example, a keyboard and/or mouse are optionally provided as well, optionally remotely from the systems described herein.

BRIEF DESCRIPTION OF THE DRAWINGS

Some aspects are herein described, by way of example only, with reference to the accompanying drawings and/or images. With specific reference now to the drawings in detail, it is stressed that the particulars shown are by way of example, and not necessarily to scale, and are for purposes of illustrative discussion of the aspects:

FIGS. 8A-8C are cell graphs displaying different positions of the wave fronts shown in FIGS. 4, 5 and 6, respectively, relative to a ground plane according to aspects of the present disclosure;

FIG. 22 is a flowchart of an automatic target recognition in SAR data process using bright and shadow segmentation according to an aspect of the present disclosure;

DESCRIPTION

Generally

Figure 1:
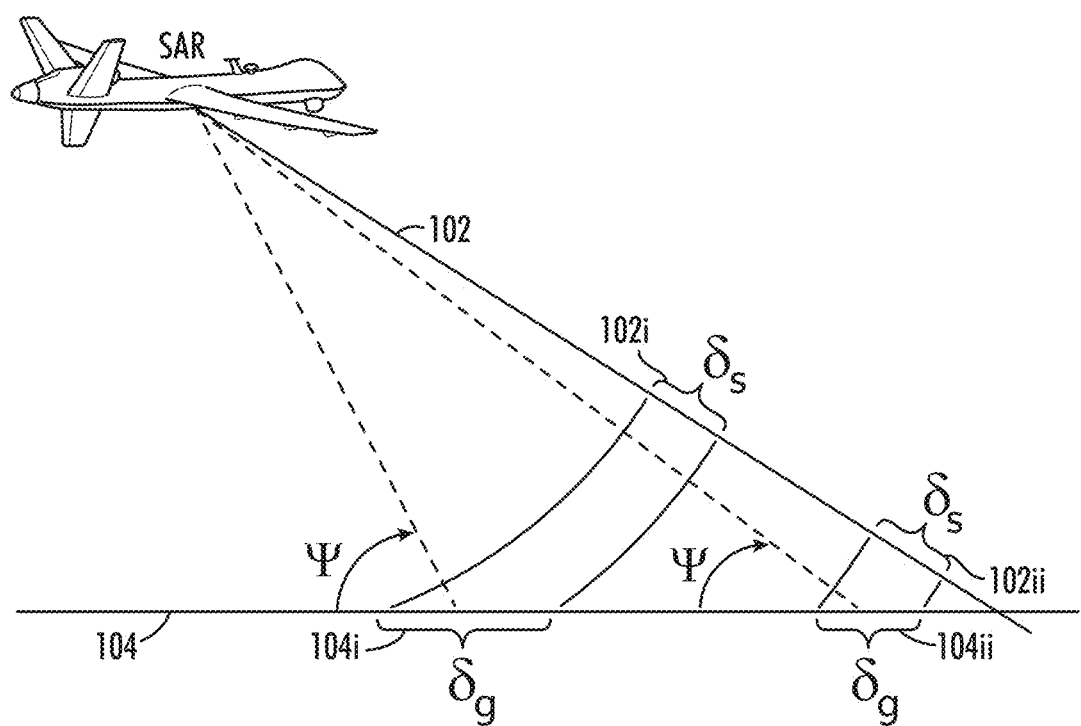
FIG. 1 is a schematic view of slant plane and ground plane SAR imaging geometry for a flat earth scenario.

The present disclosure generally relates to the field of SAR. More particularly, the present disclosure relates to the field of target recognition in SAR data.

Generally, exemplary methods and systems using a SAR regression renderer for model-based automatic target recognition ("ATR") in SAR data are described herein. For example, methods and systems are described with respect to FIGS. 12-20B, inter alia, wherein a far edge of a SAR shadow is used for ATR of a potential target. As another example, methods and systems are described with respect to FIGS. 21-29B, inter alia, wherein bright and shadow segmentation of a potential target is used for ATR. As another example, methods and systems are described with respect to FIGS. 30-36B, inter alia, for ATR using SAR data in a maritime environment.

Conventional, model-based ATR for SAR data presents a very complex problem due to complexity of prediction of electromagnetic scattering of the target. The resulting SAR images may change dramatically even with small variations of grazing angle and target pose. In addition, conventional, model-based SAR ATR requires a high fidelity SAR renderer that can produce a synthetic SAR image of the target to compare it with the measured one. The process of creation of high fidelity SAR images is highly complicated and requires a good CAD model that has proper geometry and electromagnetic properties of the materials from which the real target is constructed. As a result, a common limitation of ATR systems is the need for large training datasets which are often not available. The process of rendering a SAR image from such a model is also a highly complicated computational process that requires deep knowledge of electromagnetic scattering process. This makes it very difficult, until now, to apply SAR rendering on-the-fly in real-time ATR systems.

This disclosure addresses overcoming various limitations related to conventional model based SAR ATR including, but not limited to: 1) the traditionally high hardware requirements for SAR data analysis; 2) lack of ability to conduct real-time ATR using SAR data, particularly in the field; and, 3) issues with ATR in maritime SAR data. Further, the methods and systems described herein are optionally parallelized for further performance gain.

In some aspects of the disclosure, the methods and systems described herein are used for target detection and recognition using SAR data for airborne and/or orbital and/or mobile weapons and/or platforms. Aspects described herein will help with advanced target-recognition and/or classification, generate longer tracks, reduce false alarms, and/or maintain a high probability of target acquisition for lock-on-after-launch weapons.

In some aspects of the disclosure, use of a SAR regression renderer includes using one or more techniques for modeling and/or analyzing several variables, when the focus is on the relationship between at least one dependent variable and one or more independent variables. More specifically, regression analysis helps one understand how the typical value of the dependent variable (or 'criterion variable') changes when any one of the independent variables is varied, while the other independent variables are held fixed. In some aspects, an estimation target is a function of the independent variables called the regression function. In some aspects, distances from the target surface to the wave front, surface normals, and/or categorical description of the materials are optionally used as independent variables and SAR image pixel values are optionally used as a dependent variable of the regression. In other words, the regression is optionally used to predict the SAR image from CAD model parameters and/or materials. The regression is trained on existing CAD models and SAR images of the real targets during the training phase. In the test phase the regression predicts the SAR images of the target. This approach eliminates the SAR renderer from the system which makes model based ATR system more simple and suitable for real-time applications.

Unlike ray tracing renderers, the SAR regression renderer described herein has very low complexity and can run in real-time. It also does not require big memory storage, unlike the current state of the art where an off-line SAR renderer is used to generate all variety of target images. Further, a modified Expectation Maximization technique is described herein which adapts the to the properties of sensed SAR data and provides fast and/or robust segmentation in relation to conventional techniques.

Figure 2:
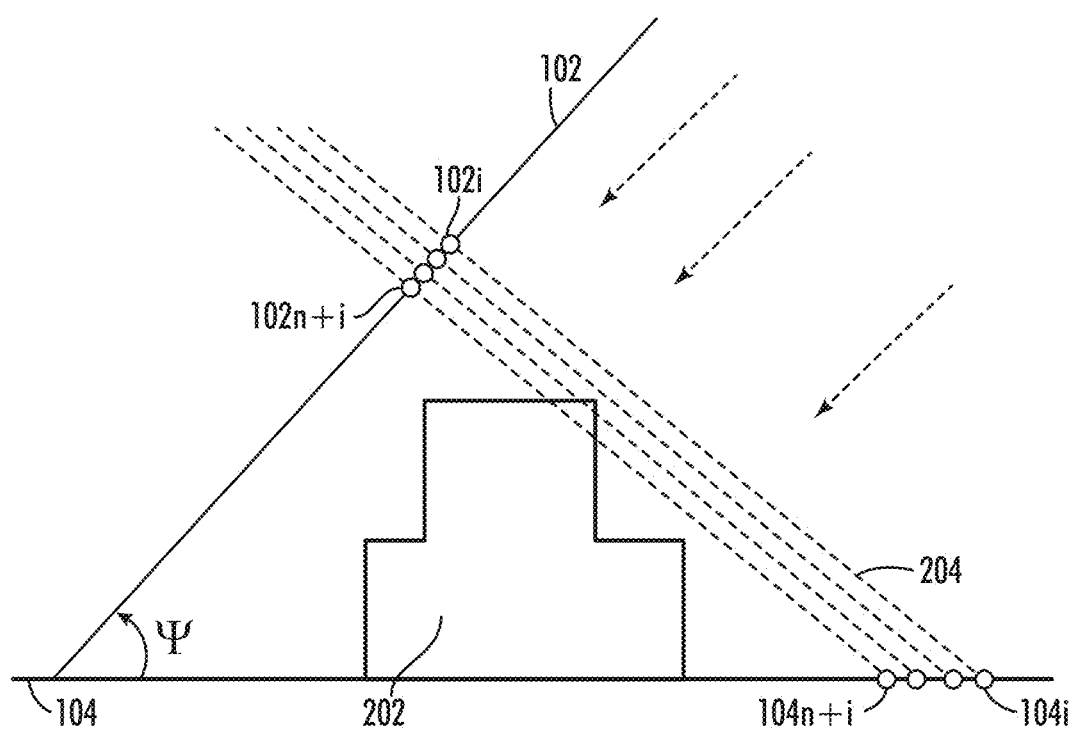
FIG. 2 is a schematic view of slant and ground plane geometry for a SAR regression renderer according to aspects of the present disclosure.

A viewing geometry of the regression SAR renderer is shown in FIG. 2. The renderer is used to produce the SAR images of targets, typically, 5-10 meters along the biggest dimension which is significantly smaller than the swath scanned by the radar sensor, which could be hundreds and thousands of meters. It is assumed herein that the wave front can be approximated as a flat surface instead of radial one corresponding to real SAR.

The shaded object 202 in FIG. 2 represents a CAD model of a potential target. The wave front 204 is positioned as it is shown in FIG. 2 to produce the corresponding ground 104$i$, 104$n$+i and slant samples 102$i$, 102$n$+i. The slant plane range sample distance or equals dg and the step along slant plane is ds. The relation between these two steps is:

$$d_g = \frac{d_s}{\cos\psi}$$

where $\psi$ is the grazing angle. Typically, the SAR images are formed for the ground plane. Each ground or slant sample generated by the renderer represents the corresponding pixels on the SAR image. The renderer produces these pixels in row by row fashion in range directions. The pixels on the same row corresponding to the same range can be formed sequentially or in parallel depending on how many outputs were created during training of the regression function. The ground samples (pixels) in FIG. 2 represent pixels in one slice along the range direction, e.g. with the same time delay. Cross range samples are generated for the same position of the wave front using Doppler measurements.

Figure 3:
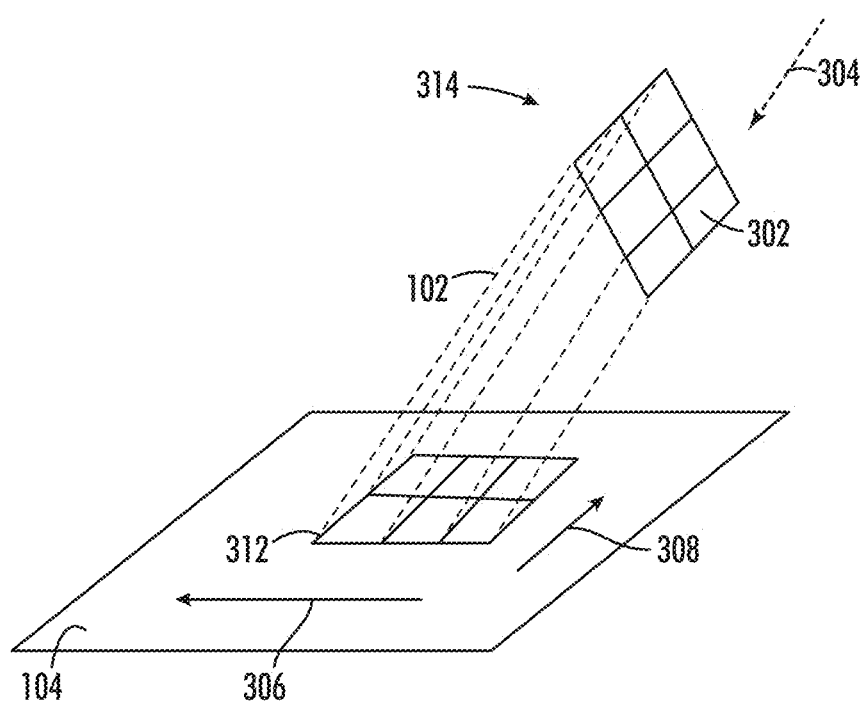
FIG. 3 is an exemplary, schematic view showing 3-D viewing geometry represented as a range map according to aspects of the present disclosure.

In order to see how features used to train the renderer are obtained, in some aspects of the disclosure, consider the 3-D viewing geometry shown in FIG. 3. The 3-D space is divided into range cells 302 of a range map 314 as viewed from the sensor (SAR) direction 304. The intersection of the cell with the ground plane 104 is a rectangle 312 with the sides corresponding to range 306 and cross range 308 spacing of the SAR image. In some aspects, each range map cell will be used to generate the inputs (features) for the regression. This process is described in more detail below with respect to FIGS. 8A-10C.

In some aspects of the disclosure, the process of generating features depends at least partly on the position of the wave front 402 relative to a CAD model 404. An exemplary progression of a wave front 402 with respect to the CAD model 404 is shown schematically in FIGS. 4-7. In the wave front 402 position shown in FIG. 4, there is no intersection between the target (CAD model) 404 and the wave front 402. The features used in regression for this case are called "positive external features" and are indicated by arrows 406 corresponding to the distance from the wave front 402 plane to the target 404 surface or ground plane 104. Additionally, surface normals 410 are optionally used as features. In some aspects, all other features are set to zeros. The signs of features representing the distance from the wave front are optionally positive or negative, depending on the direction of the measurements: positive feature is the distance from the wave front 402 to the target 404 or the ground 408 in the direction of wave propagation from the SAR or sensor; negative feature measures the distance in the opposite direction.

Figure 5:
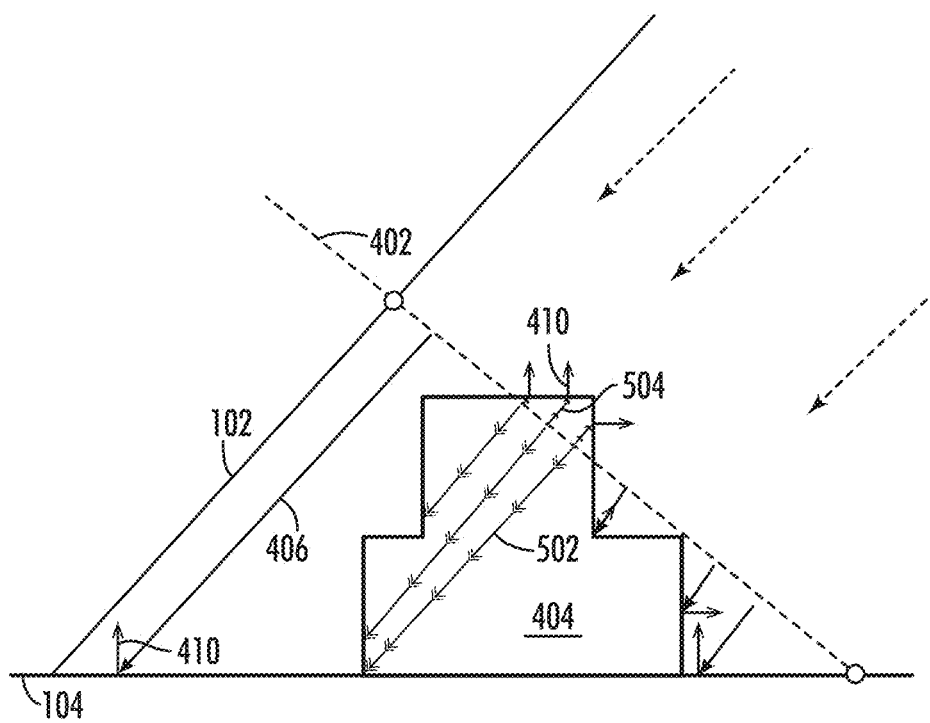
FIG. 5 is an exemplary, schematic view showing a wave front penetrating a target according to aspects of the present disclosure.

FIG. 5 shows a case when the wave front 402 starts penetrating the target 404. Features whose distances are measured inside the target 404 are called internal positive features 502 and internal negative features 504.

As explained briefly above, the input features are generated for each cell 302 of the range map 314. In some aspects of the disclosure, each cell 302 has the following input features: internal positive 502, internal negative 504, external positive 406, external negative 602 (shown in FIG. 6), and normal 410. As shown in FIG. 3, the wave front propagates through the target with the step, $d_s$, corresponding to the range resolution of the SAR image. Different positions of the wave front are shown in FIG. 2 and FIGS. 4-7.

Figures 8A, 8B, 8C:
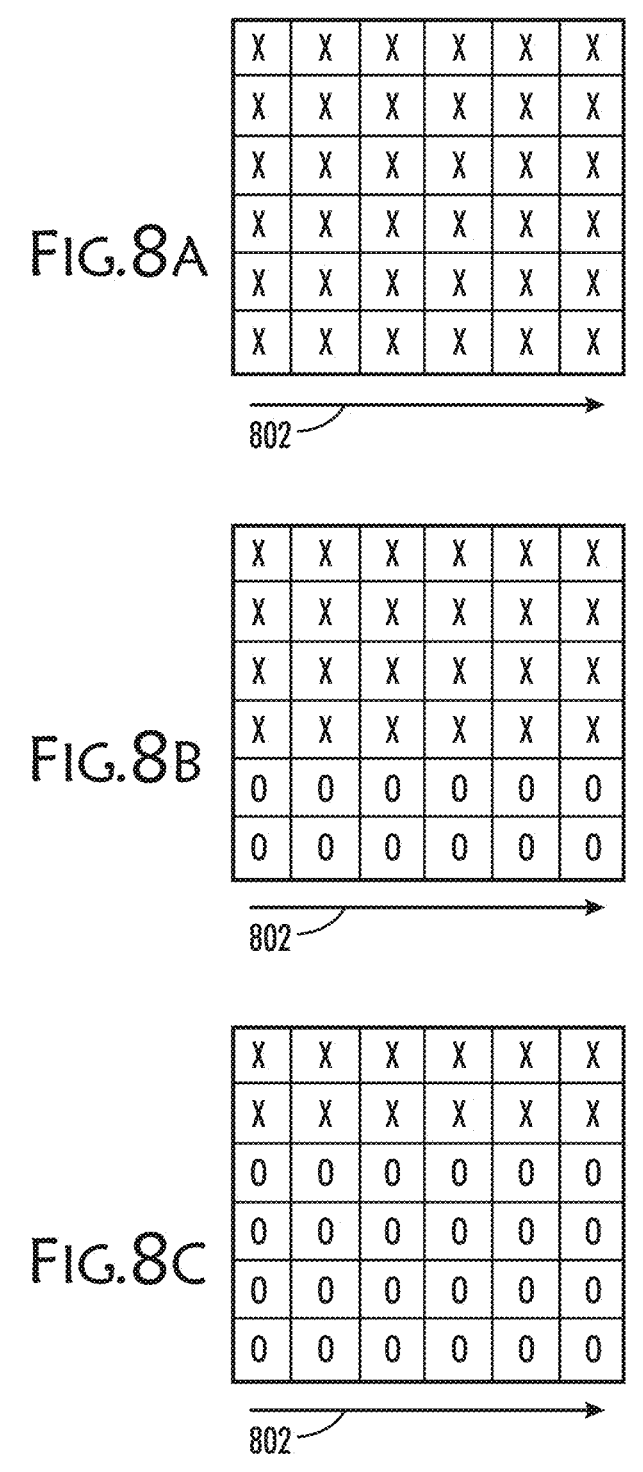

At each wave front 402 position, the values of the features are different and depend on the geometry of the CAD model 404 and position of the wave front 402. Different positions of this wave front 402 relative to the ground plane 104 and in a cross range direction 802 are shown in FIGS. 8A-8C. In some aspects of the disclosure, cells that are below the ground plane 104 have all input features set to zeros. The cells above the ground plane 104 have non-zero values for the features that exist within the cell and they are marked with X. FIG. 8A corresponds to the wave front 402 position shown in FIG. 4. FIG. 8B corresponds to the wave front 402 position shown in FIG. 5. FIG. 8C corresponds to the wave front 402 position shown in FIG. 6.

Figure 4:
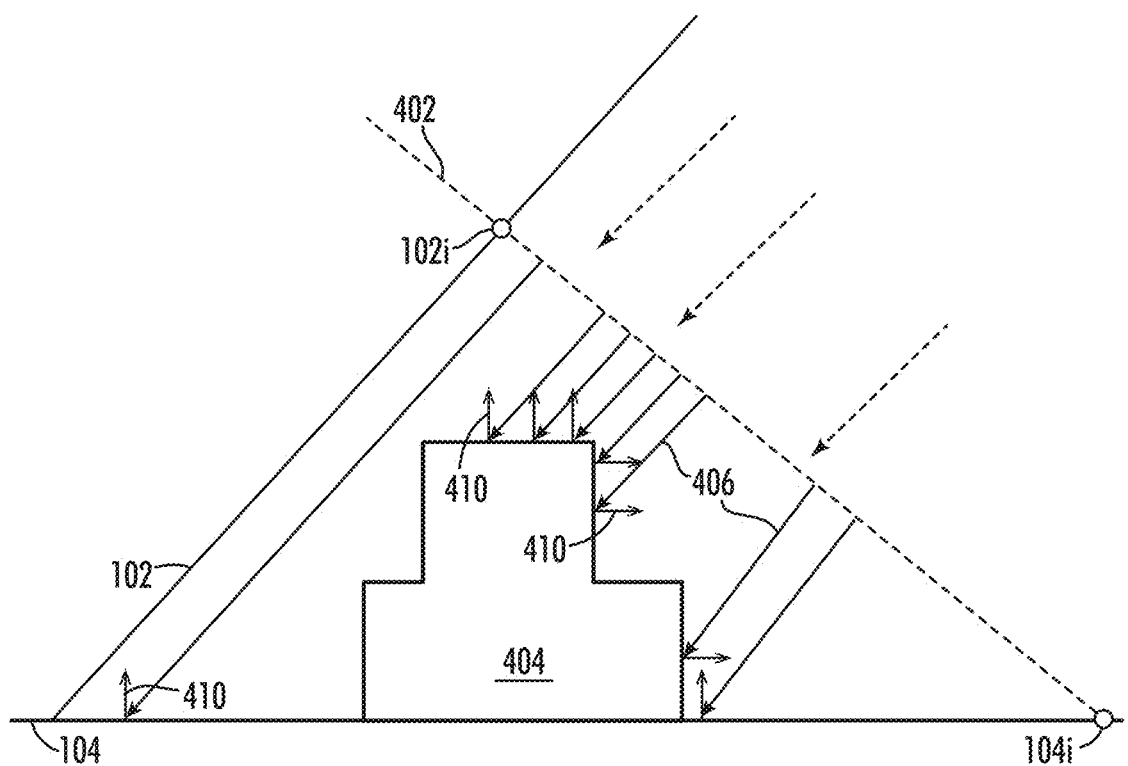
FIG. 4 is an exemplary, schematic view showing a wave front approaching a target according to aspects of the present disclosure.
Figure 6:
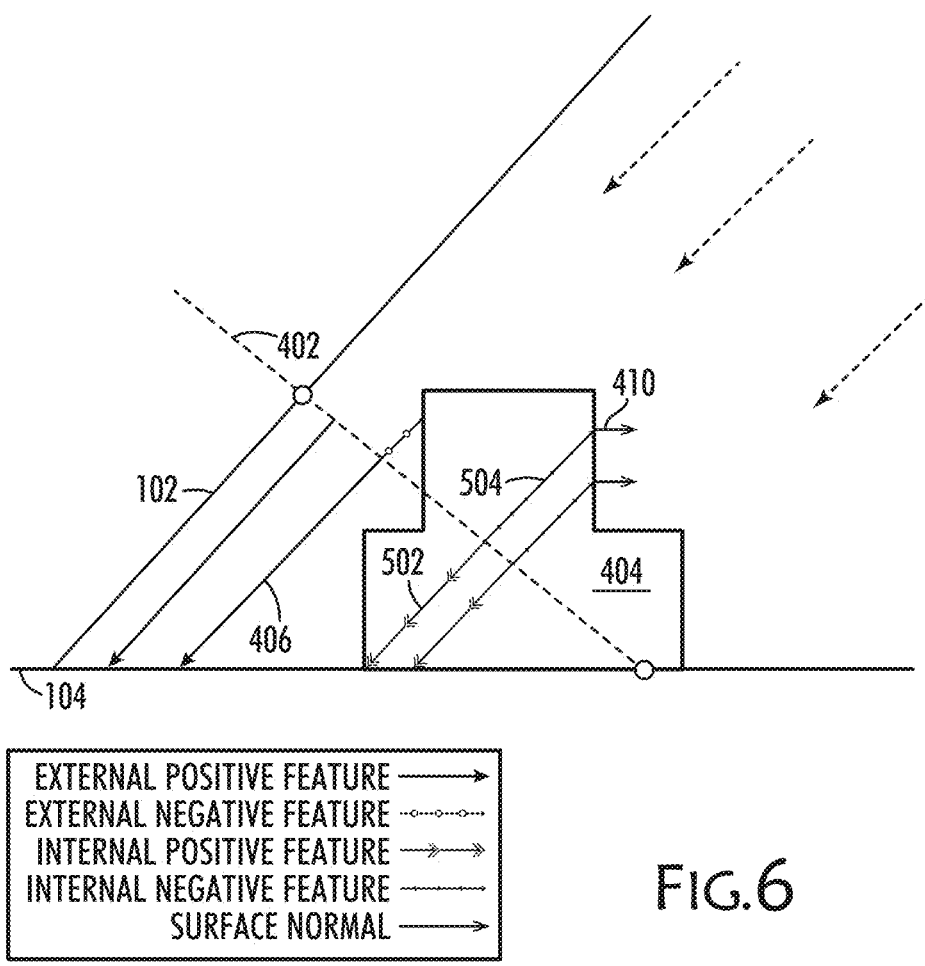
FIG. 6 is an exemplary, schematic view showing the wave front beginning to exit a target according to aspects of the present disclosure.
Figure 7:
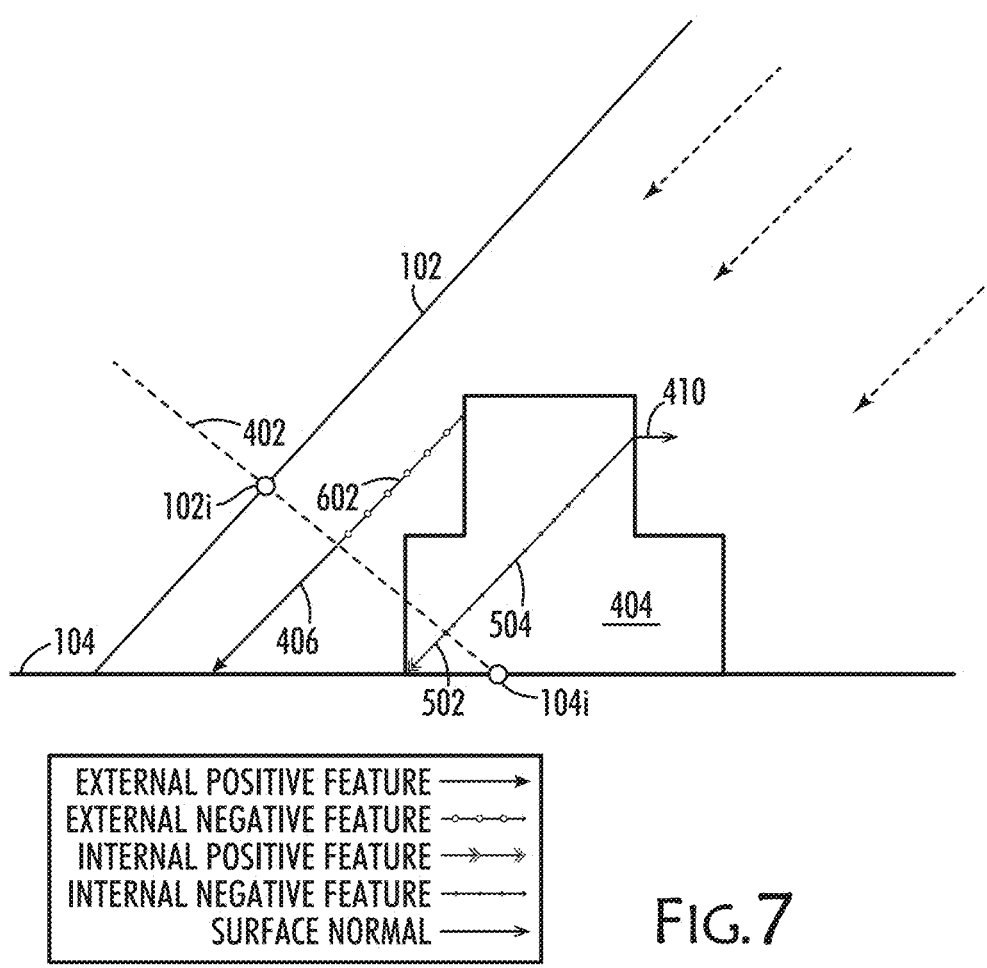
FIG. 7 is an exemplary, schematic view showing the wave front exiting a target according to aspects of the present disclosure.
Figure 9A:
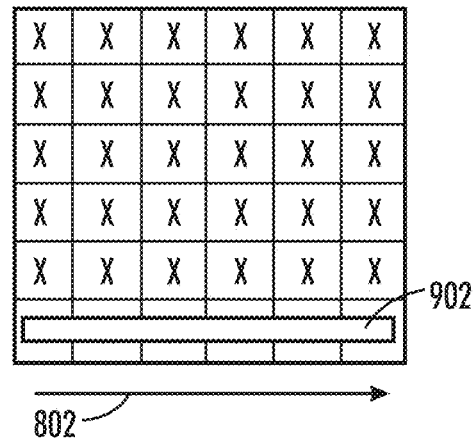
FIGS. 9A-9C are regression output cell graphs displaying different positions of the wave fronts shown in FIGS. 4, 5 and 6, respectively, according to aspects of the present disclosure.
Figure 9B:
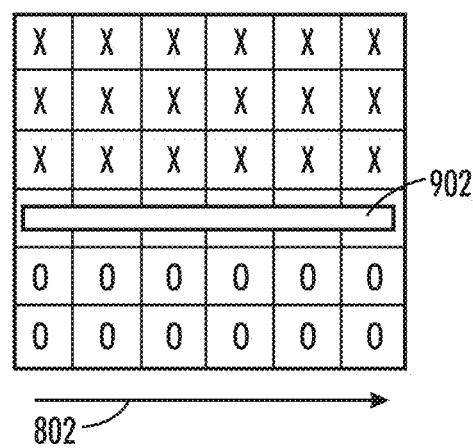
Figure 9C:
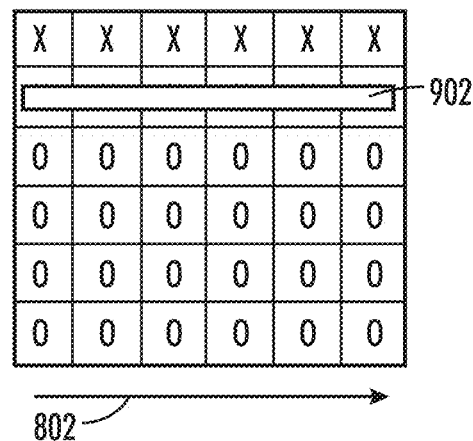

In some aspects of the disclosure, each position of the wave front 402 shown in FIGS. 4-6 produces regression outputs 902 shown in FIGS. 9A-9C, respectively. These outputs 902 correspond to the cross range pixels in a synthetic SAR image. The outputs 902 are optionally calculated simultaneously or sequentially depending on how the regressor was created during the training stage. In some aspects of the disclosure, each position of the wave front 402 generates all corresponding synthetic cross range SAR pixels. Moving the wave front 402 from the starting to the ending position will result in a full synthetic SAR image of the target, in an aspect of the disclosure.

Figure 10A:
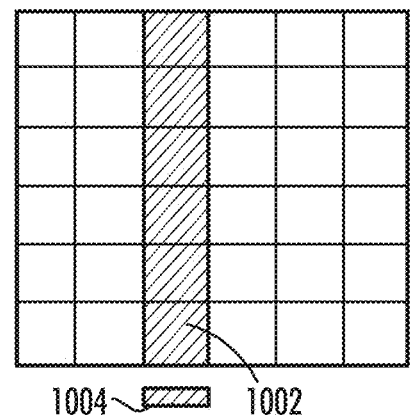
FIGS. 10A-10C are different cell combinations for a single regression output according to aspects of the present disclosure.
Figure 10B:
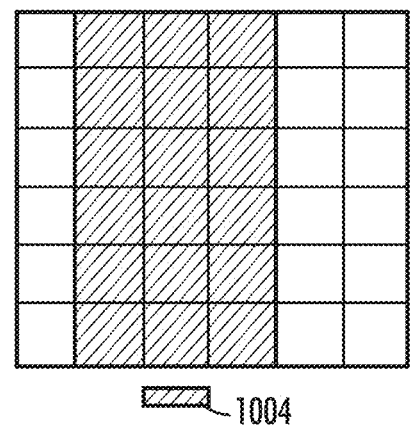
Figure 10C:
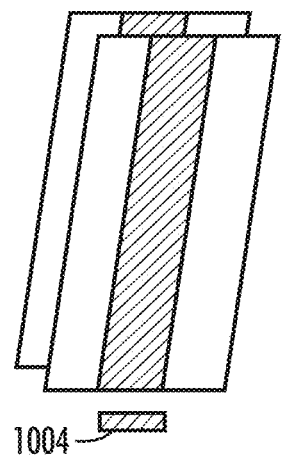

The configuration of the cells to form a single regression output can be different depending on the scenario; exemplary configurations are shown in FIGS. 10A-10C. In some aspects of the disclosure, the input vector for the regression can be created from some or all input features of the selected cells. The cells can be formed as regression from a single or multiple columns, for example as shown in FIGS. 10A and 10B, respectively, or a combination of columns from different wave front positions, such as shown in FIG. 10C. The shaded cells 1002 represent possible combinations of range map cells used for predicting a single SAR pixel 1004. In some aspects of the disclosure, the same approach is optionally used to create a regressor that generates multiple outputs simultaneously.

It should be understood that the CAD model 404 can potentially consist of different materials. In some aspects of the disclosure, at least one material is represented as a categorical feature and is added to the inputs/features of corresponding range map cell and is used in the regression. The materials can be incorporated as a categorical variable with integer numerical values greater than 0, for example, 1, 2, 3, etc., where each number represents a particular material.

An example of an input vector formed from just two cells is shown in Table 1, below. Each cell produces 6 unique input numerical values, four for the distances to/from the wave front 402 and the CAD model 404, one for the normal 410, and one for the material.

TABLE 1

| Cell 0 | External | Positive | V 0 0 |
| | | Negative | V 0 1 |
| | Internal | Positive | V 0 2 |
| | | Negative | V 0 3 |
| | Surface Normal | | V 0 4 |
| | Material | | V 0 5 |
| Cell n | External | Positive | V n 0 |
| | | Negative | V n 1 |
| | Internal | Positive | V n 2 |
| | | Negative | V n 3 |
| | Surface Normal | | V n 4 |
| | Material | | V n 5 |

Figure 11A:
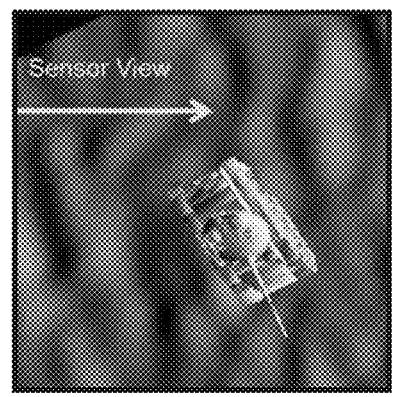
FIGS. 11A-11C show a SAR image and a target model individually and aligned for training a regression SAR renderer according to aspects of the present disclosure.
Figure 11B:
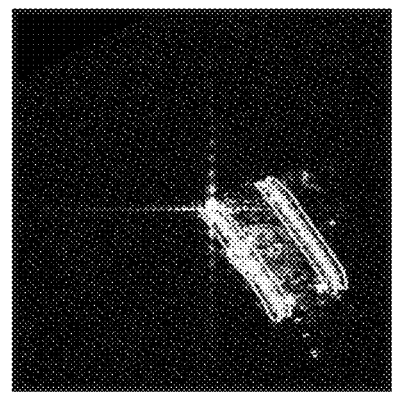
Figure 11C:
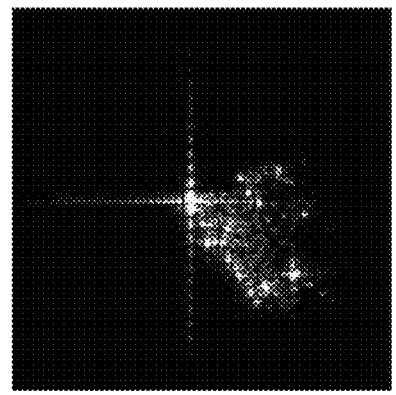

In some aspects of the disclosure, the SAR regression renderer is trained with real SAR data and/or simulated data. The training SAR image/data is aligned with the model 404 to match the SAR pixels with corresponding regression outputs, in some aspects. An example of such alignment for the data generated with Xpatch is shown in FIGS. 11A-11C, where FIG. 11A is a view of the model, FIG. 11B is the model of FIG. 11A overlaid with a SAR image, and FIG. 11C is just the SAR image. For the real data case, a Moving and Stationary Target Acquisition and Recognition (MSTAR) data set can be used since it contains SAR images with locations of the targets in the images and the aspect for each target.

The following non-linear regression algorithms are optionally used for the SAR renderer: random forest and/or SVM regression and/or neural networks and/or Deep Learning, as examples. More information about non-linear regression algorithms is available from en.wikipedia.org/wiki/Nonlinear_regression and en.wikipedia.org/wiki/Curve_fitting, the disclosures of which are incorporated herein in their entirety.

Far Edge of SAR Shadow Aspect

Some aspects of the disclosure are based on the understanding that a part of a SAR image, the far edge of a SAR shadow, is less affected by complex scattering and/or material properties. In some aspects of the disclosure, the far edge of the target shadow is used for comparison with a far edge of a shadow rendered from a CAD model of the target. This approach considerably reduces memory requirements for the system since it eliminates the necessity to store the full database of synthetic SAR images, just a database of SAR image shadow far edges.

According to some aspects of the disclosure, focus on just the far edge of the SAR image enables the utilization of a technically simple renderer, one suitable for rendering optical images of targets. The renderer used in some aspects of the disclosure renders only the shadow of the target, which makes it much less complex compared to conventional SAR and optical renderers. These properties of the renderer allow reduction of memory requirements for storing a database of predicted and/or at least partially synthetic images created off-line, since they can be created on-the-fly with the proposed rendering techniques described herein. Further, only the far edge of the SAR shadow needs to be stored for further processing, in some aspects of the disclosure.

Figure 12:
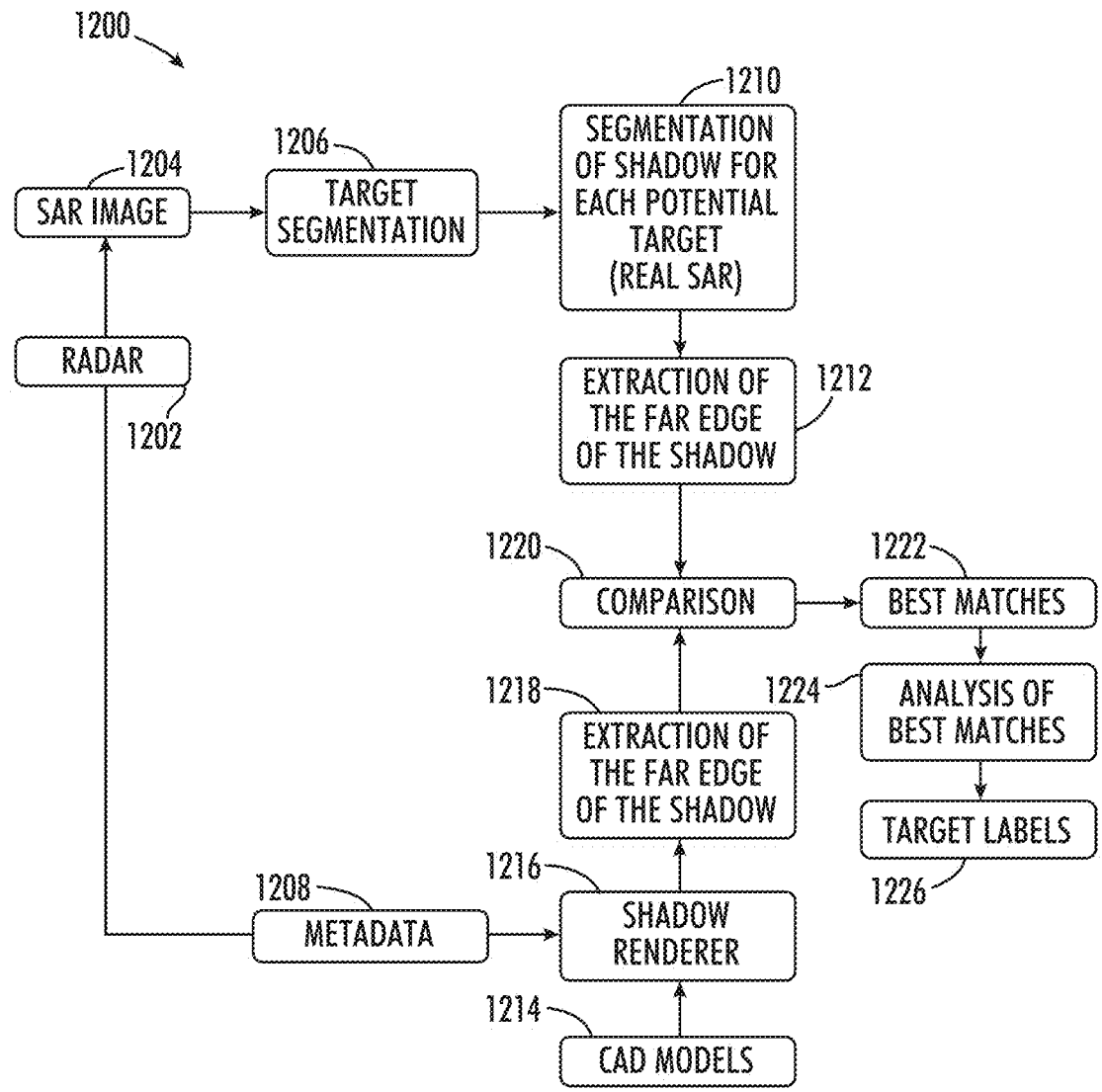
FIG. 12 is a block diagram showing a shadow far edge SAR automatic target recognition system according to aspects of the present disclosure.
Figure 13:
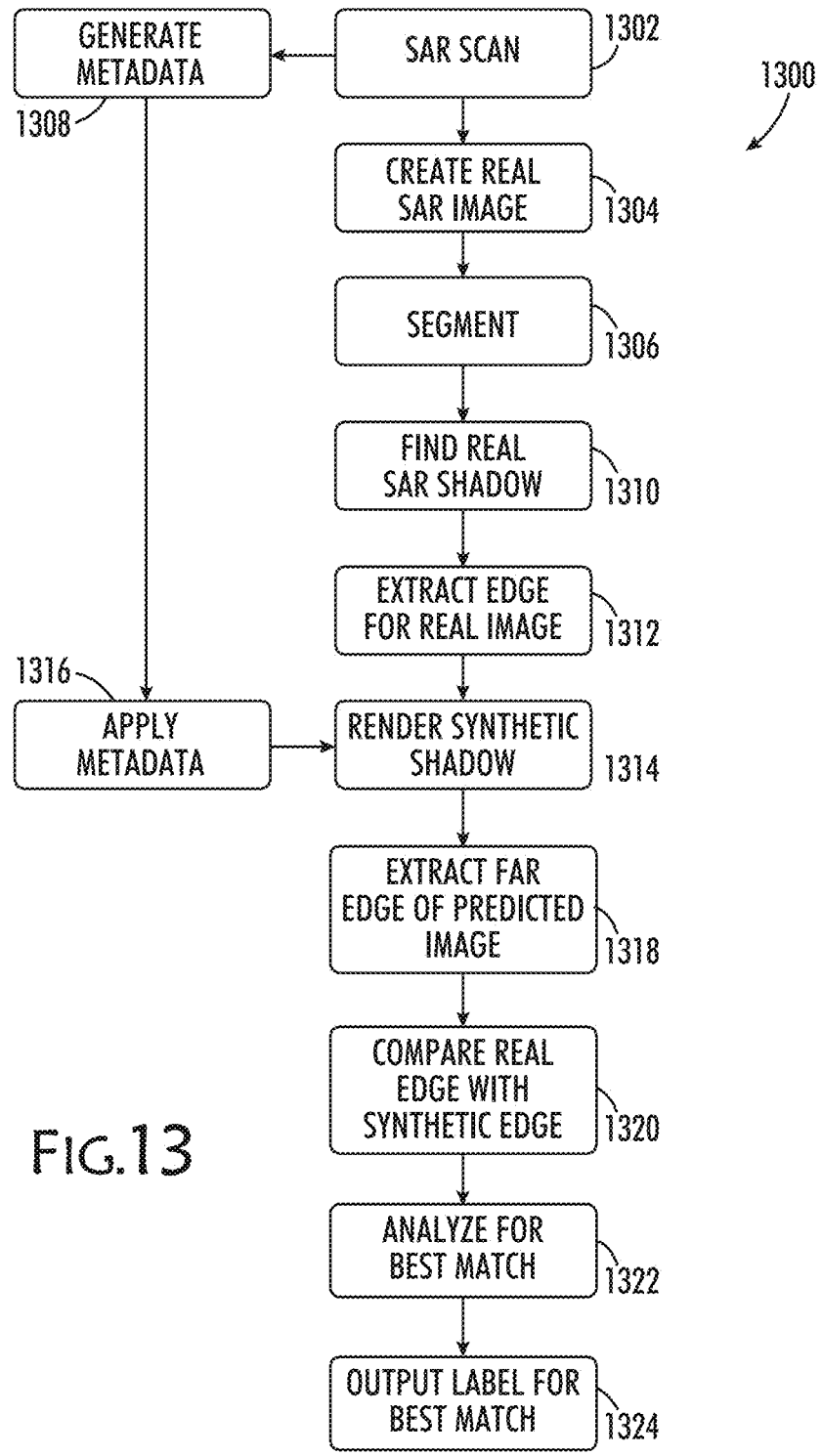
FIG. 13 is a flowchart of an automatic target recognition in SAR data process using shadow far edge according to an aspect of the present disclosure.

FIG. 12 is a block diagram showing a SAR shadow far edge automatic target recognition system 1200 according to some aspects of the present disclosure. For efficiency, the system 1200 will be described in conjunction with the flowchart 1300 of FIG. 13, which shows a process for using the system 1200 to perform ATR in SAR data using the far edge of a SAR image shadow. Some of the individual components of system 1200 are described in more detail below, after the introduction of the system 1200 as a whole.

A synthetic aperture radar device 1202 is provided that scans (1302) a ground area of interest and creates (1304) at least one SAR image 1204. It should be understood that in some aspects, the radar device 1202 is mounted on an airborne and/or orbital and/or mobile weapons platform, for example a vehicle (e.g. manned and/or unmanned, aerial, rotorcraft, orbital and/or terrestrial), a satellite, a space station and/or ordnance. In practice, the SAR images 1204 generated (1304) by the scanning (1302) usually contain both targets and clutter (non-targets). In some aspects of the disclosure, a target segmentation component 1206 is used to segment (1306) bright and shadow in the SAR image 1204 to identify potential target locations, some of the potential targets are likely to be real targets and some of the potential targets are likely to be clutter/non-targets. In some aspects of the disclosure, the radar 1202 also generates (1308) metadata 1208 associated with the SAR images 1204, for example grazing angle, aspect angle, geolocation, etc. A real SAR shadow (SAR data from the actual radar 1202) segmenting module 1210 takes a sub-image, or a portion of the SAR image 1204, that contains potential targets and finds (1310) at least one SAR shadow area in this sub-image. In an aspect, the far edge of the at least one SAR shadow is extracted (1312) by a far edge extraction module 1212.

In some aspects of the disclosure, a database 1214 containing at least one CAD model is provided. Optionally, the database 1214 contains a plurality of CAD models of potential targets. As described above, a "simple" SAR renderer 1216 is used to render (1314) a synthetic SAR shadow of the at least one CAD model in the database, optionally using the metadata 1208 as applied (1316) to the at least one CAD model. A module 1218 is used to extract (1318) a far edge of each SAR shadow rendered (1314).

In some aspects of the disclosure, the far edge of the real SAR image extracted (1312) is compared (1320) by a comparison processor 1220 to the extracted (1318) far edge of the at least one CAD model from the database 1214 in order to narrow down the potential target candidates to a set (possibly just one) of generated best matches 1222. A best match analysis (1322) is performed by a best match processor 1224 (determining which of the CAD model far edges match the real SAR image far edge the closest) in order to determine which potential target in the set of best matches is the closest. In some aspects of the disclosure, a target label 1226 for the best match is output (1324) from the system 1200, wherein the output label matches the label of the best match CAD model which was previously stored on the database 1214. While not shown in FIG. 12, the system 1200 is provided with internal and/or external communications capability, wherein the various modules within the system 1200 are configured to communicate with each other and/or external entities. It should be understood that not each function and/or component described has to be separate from some or all of the others. That is, some or all of these components and/or functions could be combined into fewer or one physical component. Further, actions shown in the flowchart 1300 do not necessarily have to be performed serially, some actions can be performed in parallel.

Figure 14A:
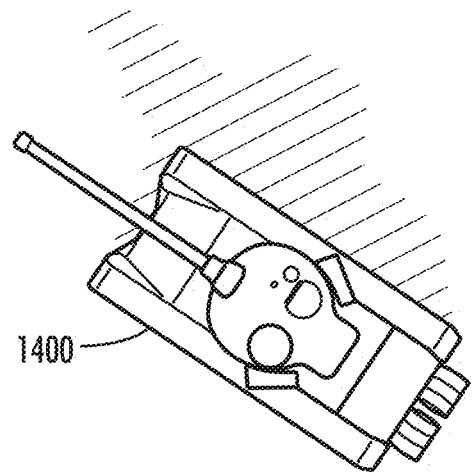
FIGS. 14A-14B are exemplary views of a SAR image of a potential target and a far edge of a shadow of the target.
Figure 14B:
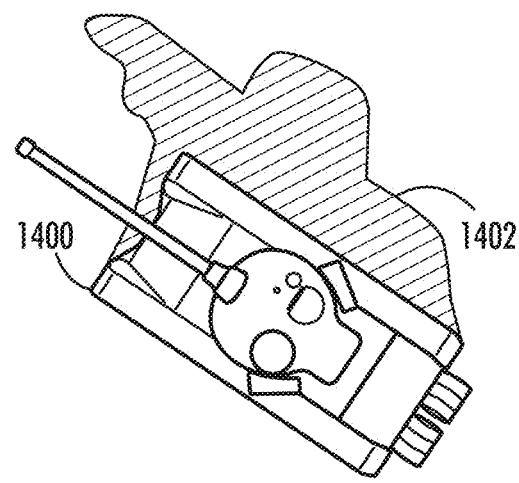

The far edge of the SAR shadow of a target depends mostly on the geometry of the target, aspect and grazing angles. This makes it easier to reproduce the far edge from the CAD model using simple rendering techniques. Full, correct shadow rendering (as opposed to just the edge) requires simulation of a complex scattering process that takes into account self-shadowing effects, etc. FIGS. 14A-14B show an example of the actual SAR image of a T-72 tank 1400 (FIG. 14A) and the far edge of the shadow 1402 (FIG. 14B) of the tank 1400.

Figure 15:
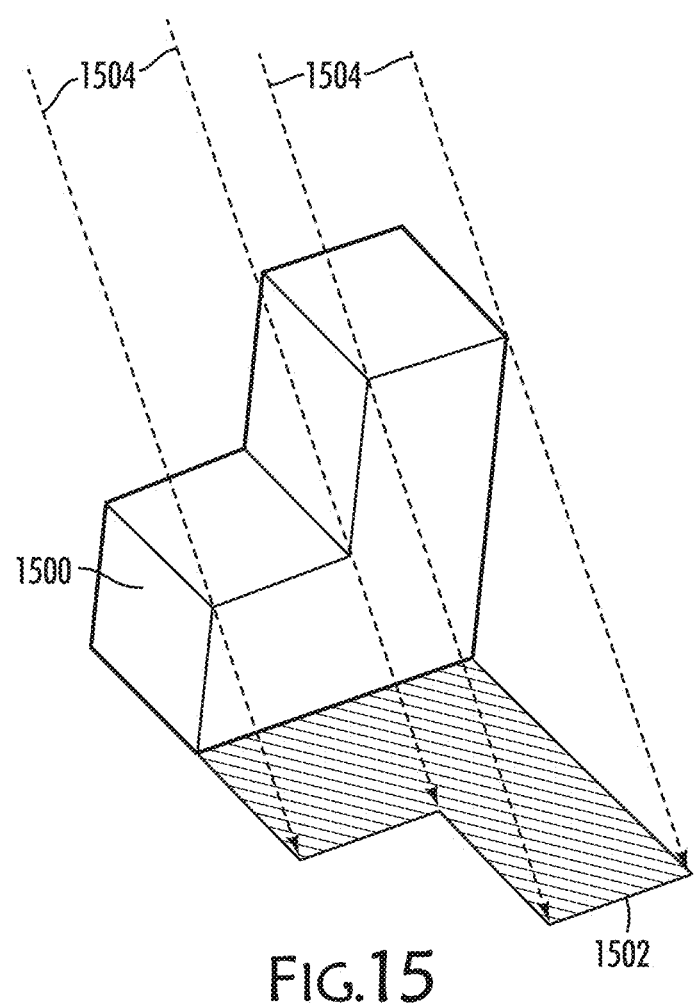
FIG. 15 is a schematic view showing an example of shadowing in a SAR image.

FIG. 15 shows an example of shadowing in a SAR image using a simplified model 1500. In this simplified view, the far edge of the shadow 1502 can be considered as the result of orthographic projection of the model/target 1500 into the ground plane from the sensor direction 1504. The vertical profile of the target 1500 can be restored by projection of the far edge of the shadow 1502 into the vertical plane that is aligned with the cross range axis, such as shown and described with respect to FIG. 3. In some aspects of the disclosure, this technique is used for determining features of objects in SAR images.

Figure 16:
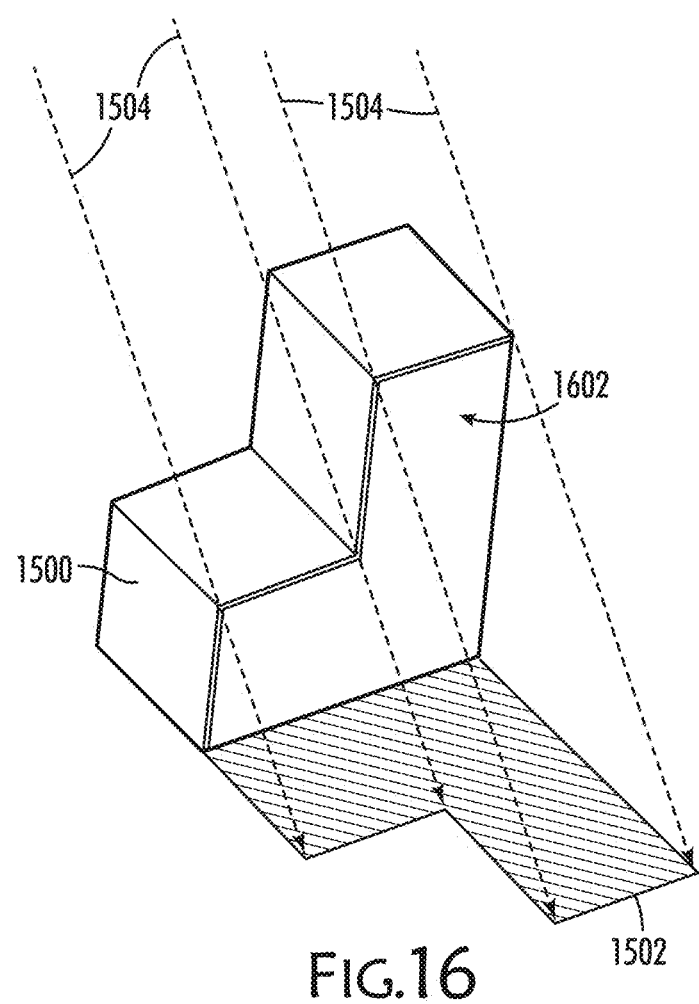
FIG. 16 is a schematic view showing reconstruction of a vertical profile of the target of FIG. 15 from the far edge of the shadow according to aspects of the present disclosure.

An example of reconstruction of a vertical profile 1602 of the CAD model 1500 is shown in FIG. 16. However, reconstruction of the vertical profile of ground targets could be more difficult because of more complex geometry.

Figure 17:
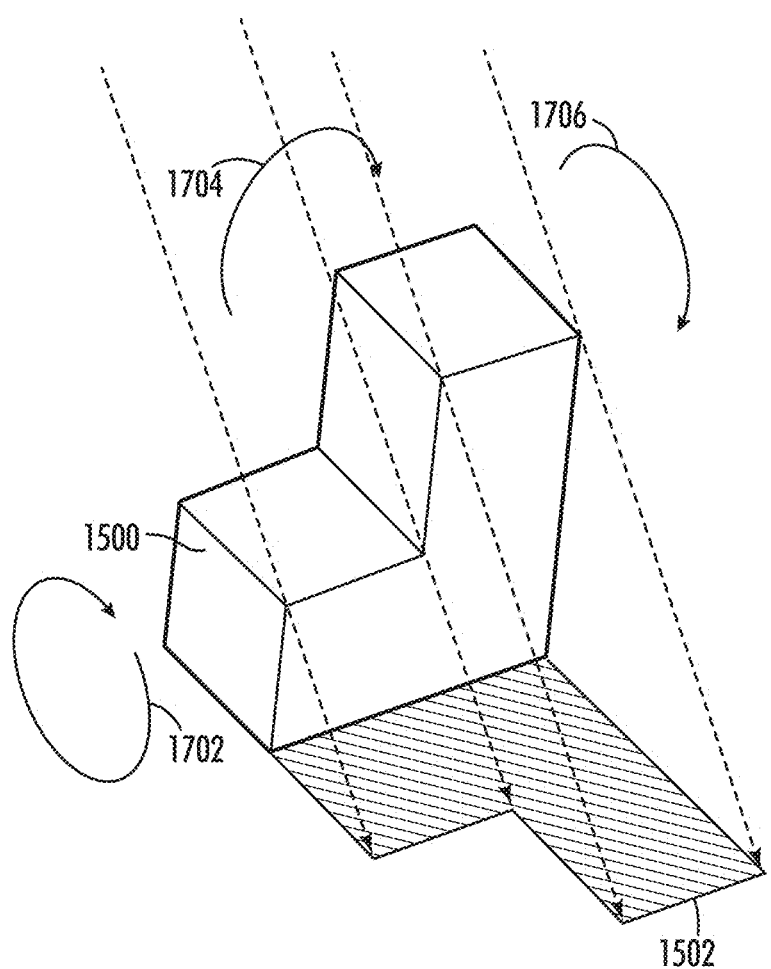
FIG. 17 is a schematic view of various variations of the far edge of the shadow of FIG. 15 that could be generated by an orthographic renderer according to aspects of the present disclosure.

In order to avoid incorrect reconstruction of the vertical profile 1602 of the target 1500, in some aspects an orthographic renderer is used to generate multiple variations of the far edge of the shadow 1502 and compare it with the real one. The variations are created for different aspect 1702, grazing 1704, and tilt angles 1706 as shown in FIG. 17.

In some aspects, for targets that have articulations, like turrets and/or guns, additional search parameters may be used to find (1322) the best match. The range and step of the search are defined for each angle individually to reduce number of computations needed for ATR, in some aspects.

The process of segmentation (1306) of potential targets in SAR imagery is optionally conducted by existing methods described in U.S. patent application Ser. No. 13/173,891 and Pink, Tan Hwee and Ramanathan, U., "Extraction of height information from target shadow for applications in ATC", Geoscience and Remote Sensing Symposium, 1999, as examples. The segmentation of SAR images provides the locations of dark and bright areas that can contain potential targets. The locations of these potential targets are used to extract (1312) far edges of shadows for further classification.

A number of methods are available for extraction of the far edge of the shadow from SAR images of potential targets, including Papson, Scott and Narayanan, Ram, "Modeling of Target Shadows for SAR Image Classification", $35^{th}$ Applied Imagery and Pattern Recognition Workshop (AIPR '06). This section describes the SAR renderer 1216 that is used, in some aspects, to generate the synthetic far edge of the shadow from the CAD model of a potential target. An example of orthographic rendering is shown in FIG. 18.

OpenGL (www.opengl.org) and other software tools provide a variety of ways for implementing an orthographic renderer for different applications. Since it is conceived by this aspect of the disclosure that only the shadow features are utilized, the SAR renderer 1216 can even be simpler to accomplish just this task.

Figure 18:
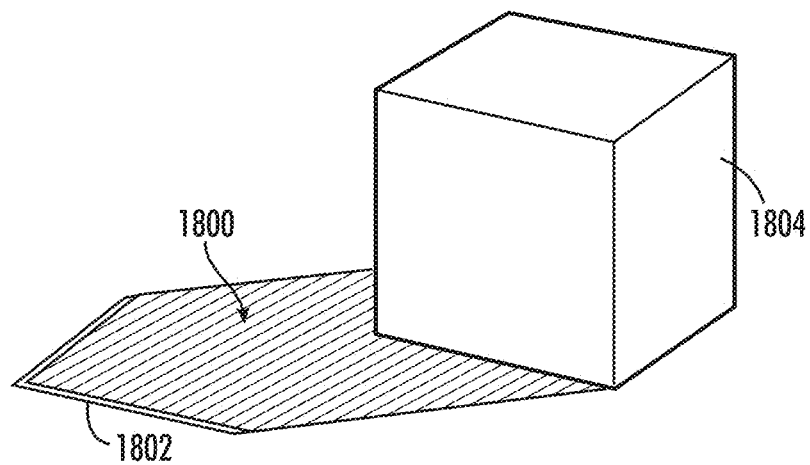
FIG. 18 is an example of an orthographic projection of a cube.

In some aspects, the far edge of the synthetic shadow 1802 is viewed as the part of the shadow contour 1800 that does not include the CAD model itself 1804 (adjacent edges) as it's shown in FIG. 18. This contour 1800 may "touch" the CAD model 1804 but should not have any common edges.

The images produced by the "simple" SAR renderer 1216 must be scaled to match range and cross range resolutions of the real SAR image 1204. The renderer module 1216 generates a variety of orthographic projections of the CAD model for the range of grazing, aspect and tilt angles of the CAD model relative to the radar 1202 location as described above. Each combination of these angles will produce an image and corresponding far edge of the shadow.

The synthetic far edge of the shadow can also be smoothed with some averaging filter and/or using regression trained on real examples and corresponding CAD models.

In some aspects, the renderer 1216 uses aspect angles relative to the radar 1202, however, the output aspect angle is optionally provided in a global coordinate system since the location of the radar 1202 is known in this global coordinate system.

The comparison module 1220 compares (1320) a far edge of the shadow extracted (1312) from the real SAR image 1204 of the potential target with a synthetic far edge of the shadow extracted (1318) from orthographic projection of the target CAD model. The comparison (1320) between the extracted far edge of the shadow from real SAR image and variety candidates obtained from CAD models is optionally performed sequentially, in some aspects.

Figure 19:
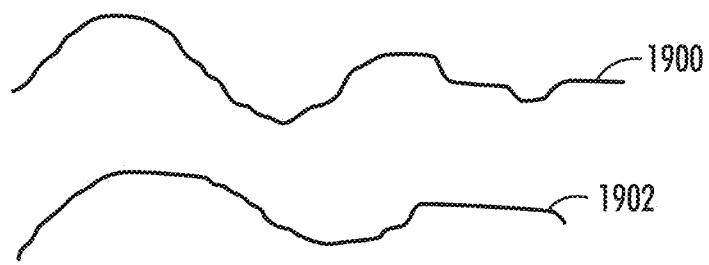
FIG. 19 is a schematic view showing a comparison of far edges of a shadow for a real and a synthetic SAR projection according to aspects of the present disclosure.

Examples of real and synthetic SAR projections are shown in FIG. 19. The top curve 1900 represents real SAR projection, the bottom curve 1902 is the synthetic one. The synthetic projection is generated for aspect angles α and α+π (where π is 180°), optionally for the reason that the "front" and the "back" of the target are unknown. The results generated by the renderer 1216 may have different offset and scaling which makes it difficult to do direct comparison of the curves. In an aspect of the disclosure, the least square method (en.wikipedia.org/wiki/Least_squares) is used to find the offset and scaling between the real SAR projection and the synthetic one in the form:

$$f_r(x)=b*f_s(x)+a$$

where $f_r(x)$ is the real SAR projection, $f_s(x)$ is the synthetic SAR projection, x is the range coordinate, b is the scaling factor, a is the offset.

The comparison of the closeness of the curves is based on the chi-square criteria $$X^2(a, b) = \sum_{i=1}^{N}\left(\frac{f_r(x_i) - a - bf_s(x_i)}{\sigma_i}\right)$$

where $x_i$ is the value of range at sample i, a is the offset and b the slope found using the least square method, N is the number of samples in the projection, and $\sigma_i$ is the standard deviation of the error. After the left hand value is calculated the threshold is determined by equation:

$$V_t = K*\sqrt{X^2(a,b)/N}$$

where K is a constant found empirically.

More details on Chi-square calculations can be found in *Numerical Recipes in C: The Art of Scientific Computing, Second Edition*, Hardcover—Oct. 30, 1992 by William H. Press, Brian P. Flannery, Saul A. Teukolsky, and William T. Vetterling, the disclosure of which is incorporated herein in its entirety.

In some aspects, the comparison (1320) is performed for both synthetic projections and the minimal value is used to generate the classification output if it's below the threshold. Since the curves may not align correctly due to different factors the comparison above could be performed for different shifts of the one curve relative to the other to find the best match.

Best matches 1222 for each target candidate are generated in a module that receives comparison results (Chi-square value) with the corresponding grazing, aspect, and tilt angles. The module finds the lowest value of Chi-square output for each target candidate. It should be understood that the aspect of the target is optionally provided relative to the global coordinate system (metadata). The best match for a target candidate i can be represented as vector:

$$[V_i, a_i, g_i, t_i]$$

where $V_i$ is the Chi-square value divided by N (N is the number of samples used in regression), $a_i$ is the aspect angle in global coordinate system, $g_i$ is the grazing angle, $t_i$ is the tilt angle.

Figure 20A:
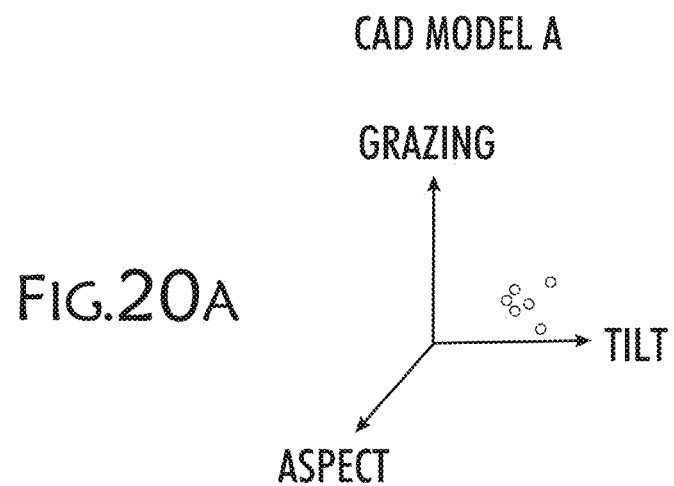
FIGS. 20A-20B are graphs showing clustering for analysis of best matches according to aspects of the present disclosure.
Figure 20B:
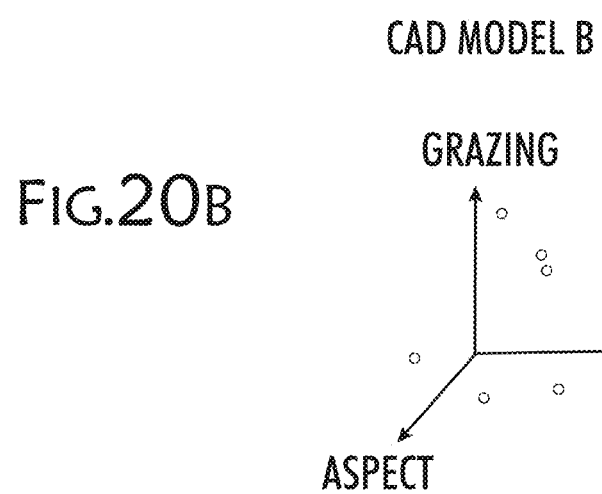

In some aspects of the disclosure, vectors for the best matches are propagated to of best match analysis module 1224 for further analysis (1322). This analysis is based on clusters of the best matches for each target candidate defined by a corresponding CAD model, in some aspects. Examples of clustering for true and false targets are shown in FIGS. 20A-20B. The clusters are created for at least one of aspect, grazing, and tilt angles. A true target will likely create a compact cluster as shown in FIG. 20A, while false targets are likely to create sparse clusters such as shown in FIG. 20B.

The output for each target candidate is created as:

$$T_{out}=V_{ave}*D_{ave}$$

where $V_{ave}$ is the average Chi-square (divided by N) value for all observations, $D_{ave}$ is the average distance to the center of the cluster created by aspect, grazing, and tilt angles. The minimum value of $T_{out}$ will correspond the target of interest unless it's greater than a specified threshold (determined experimentally) and the output will be "no-class" label.

The output target labels 1226 can be updated after some or every new SAR observation from the radar 1202 of the potential target and comparison (1320) of the far edge of the shadow with the synthetic edge generated by the SAR regression renderer 1216 from the CAD models. Eventually, the process will converge to a true target and eliminate false ones. Depending on the locations of the observations and target complexity, different targets may require different number of observations for high confidence classification.

In some aspects, potential targets classified as unknowns or targets or non-targets are reprocessed when additional SAR data is available, for example the real SAR target candidate may be more easily identified at a different grazing and/or aspect angle than the original comparison. This reassessment could be performed for verification of classification/labelling of a target/non-target or to assign a label to an unknown.

Shadow and Bright Segmentation Aspect

Some aspects of the disclosure are based on using a SAR regression renderer to apply machine learning to predict SAR images in real-time from CAD models. These properties of the renderer allow reduction of memory requirements for storing a database of predicted images created off-line, since they can be created on-the-fly with the proposed shadow and bright segmentation rendering technique. In some aspects of the disclosure, a modified expectation maximization process is also used which adapts to the properties of SAR data and provides fast and robust segmentation relative to current methodologies.

Figure 21:
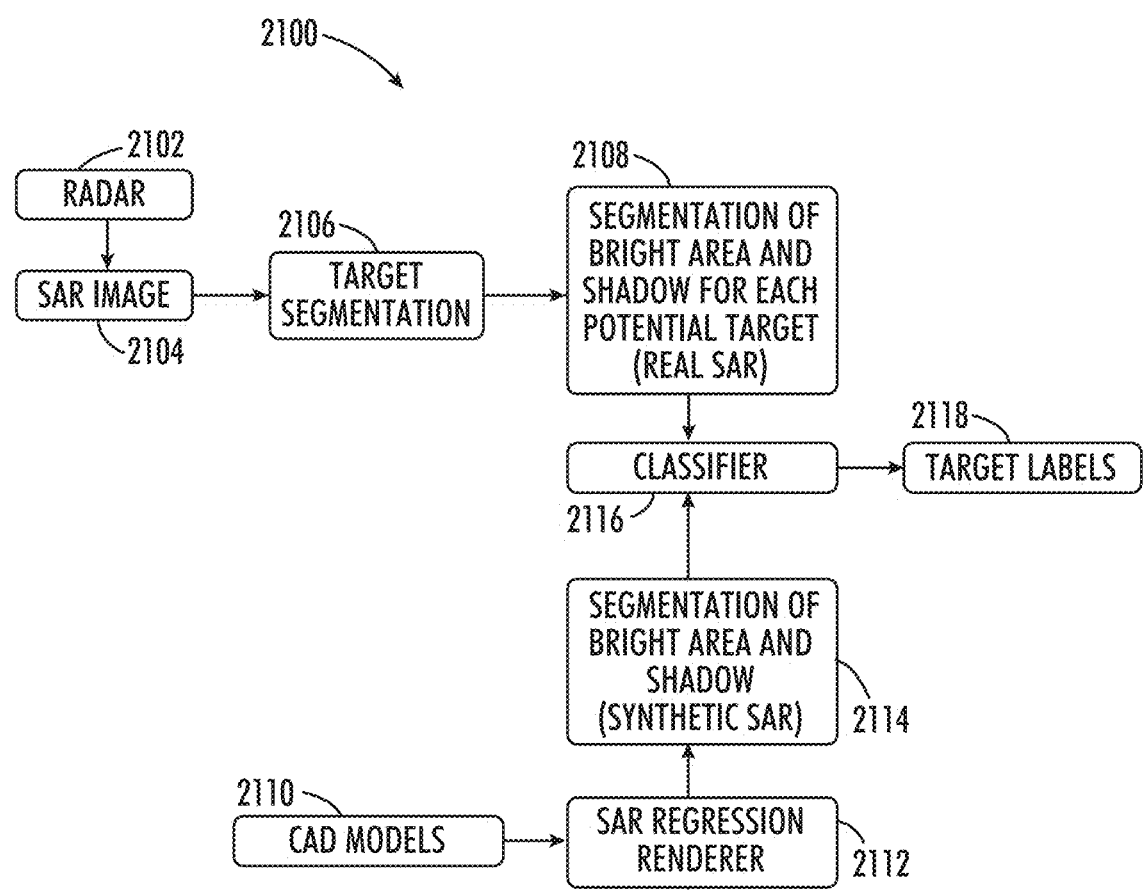
FIG. 21 is a block diagram showing a bright and shadow segmentation SAR automatic target recognition system according to aspects of the present disclosure.

FIG. 21 is a block diagram showing a bright and shadow segmentation SAR automatic target recognition system 2100 according to aspects of the present disclosure. For efficiency, the system 2100 will be described in conjunction with the flowchart 2200 of FIG. 22, which shows a process for using the system 2100 to perform ATR in SAR data using the shadow and bright segmentation. Some of the individual components of system 2100 are described in more detail below, after the introduction of the system 2100 as a whole.

A synthetic aperture radar device 2102 scans (2202) a terrestrial area of interest and generates (2204) at least one SAR image 2104. The at least one SAR image 2104 could contain at least one target and/or clutter (i.e. non-targets). A target segmentation module 2106 is uses coarse segmentation (2206) to find potential target locations in the SAR image 2104, wherein some of the potential targets may be clutter or false targets. In an aspect of the disclosure, a SAR image segmentation module 2108 is used to identify using fine segmentation (2208) shadow and bright areas in a sub-image (a potential target location) of the SAR image. A "guided" expectation maximization process, described in more detail elsewhere herein, is optionally used to achieve better segmentation performance and/or processing speed in relation to current methodologies.

In an aspect of the disclosure, a database 2110 of at least one CAD model of a potential target is provided to the system 2100. A SAR regression renderer 2112, at least partly based on machine learning, generates (2210) a predicted/synthetic SAR image of at least one potential target using aspect and grazing angles determined by the radar 2102 which scanned (2202) a real SAR image to which the synthetic SAR image will be compared (2214). Optionally, filtering is performed on at least one potential target CAD model in the database prior to the generating (2210), for example eliminating models which could be ruled out as a possible match based on size (e.g. the model is too large or too small in relation to the real SAR image target). In some aspects, the SAR regression renderer 2112 uses CAD model geometry and/or materials as input (independent variables) for the regression that was trained on known targets with real (i.e. known) SAR data and CAD models of these targets. The real SAR data for the training can be generated by a radar or high fidelity SAR simulation software like Xpatch. In some aspects of the disclosure, the machine learning/training occurs before deploying the system 2100 in the field. In an aspect of the disclosure, a synthetic SAR segmentation module 2114 is used to extract (2212) shadow areas and bright areas from the synthetic SAR image generated (2210) by the SAR regression renderer 2112. The process of obtaining the bright and shadow masks can be applied to the output of the renderer 2112 as an alternative to thresholding and other methods (for example, thresholding, morphological, etc.).

In some aspects of the disclosure, a classifier 2116 is configured to compare (2214) bright areas and shadow areas of the sub-image previously segmented (2206, 2208) with the bright areas and shadow areas of synthetic SAR images generated (2210) by the SAR regression renderer 2112 to find a match to the real SAR image target from the list of CAD models of potential targets. If a match between the real SAR image target candidate and a synthetic SAR image is found, the target is labelled (2216) with a label 2118.

While not shown in FIG. 21, the system 2100 is provided with internal and/or external communications capability, wherein the various modules within the system 2100 are configured to communicate with each other and/or external entities. It should be understood that not each function and/or component described with respect to system 2100 has to be separate from some or all of the others. That is, some or all of these components and/or functions could be combined into fewer components or one physical component. Further, actions shown in the flowchart 2200 do not necessarily have to be performed serially, some actions can be performed in parallel.

There are two segmentation modules 2108, 2114 in the system 2100 shown in FIG. 21. One segmentation module 2108 is for real SAR data and one 2114 is for the synthetic or synthetic SAR data.

Figure 23A:
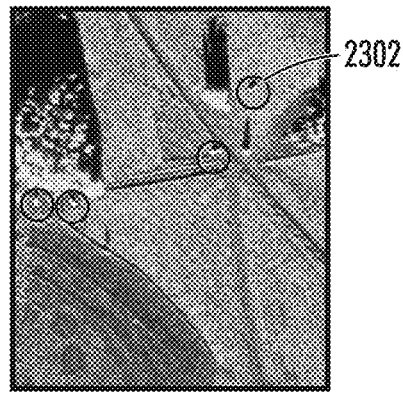
FIGS. 23A-23D show initial bright and shadow segmentation of a SAR image according to aspects of the present disclosure.
Figure 23B:
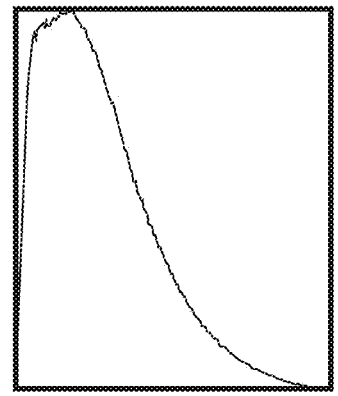
Figure 23C:
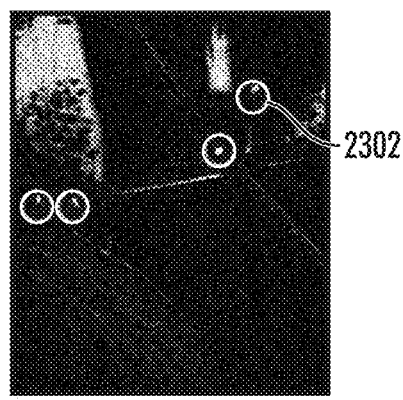
Figure 23D:
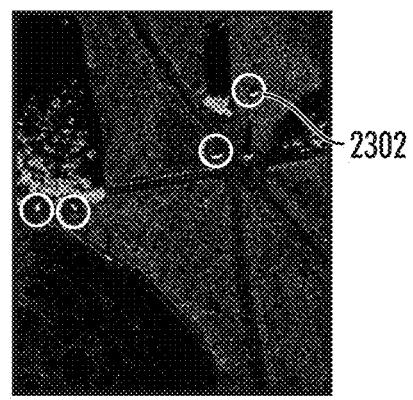

In some aspects, the segmentation process of the real SAR data can be accomplished as described below. Coarse segmentation (2206) of the SAR image is performed with a method described in Papson, Scott and Narayanan, Ram, "Modeling of Target Shadows for SAR Image Classification", 35$^{th}$ Applied Imagery and Pattern Recognition Workshop (AIPR '06). This method provides good coarse segmentation (2206) and allows for selection of real SAR data target candidates. This is illustrated in FIGS. 23A-23D, where FIG. 23A is the real SAR image, FIG. 23B is a histogram of FIG. 23A, FIG. 23C is a shadow area segmentation of FIG. 23A, and FIG. 23D is a bright area segmentation of FIG. 23A. The target candidates are selected by the size of bright and dark blobs also shown in circles 2302 in the corresponding images in FIGS. 23A-23D. However, this coarse segmentation (2206) may not be good enough to correctly classify the shape of the bright areas and shadow areas of the potential target.

Figure 24A:
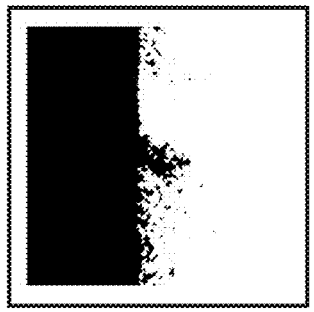
FIGS. 24A-24C show exemplary improper segmentation results of a SAR image.
Figure 24B:
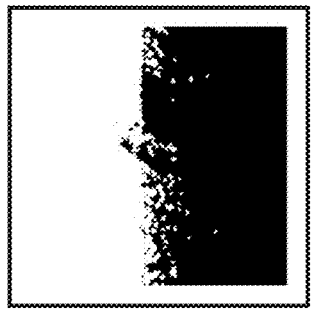
Figure 24C:
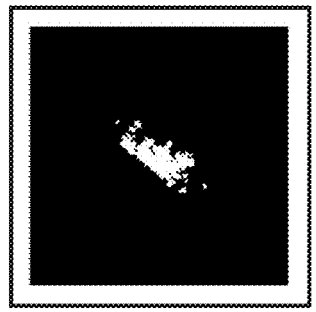

A fine segmentation (2208) is optionally performed to clarify the potential real SAR image target candidate. In some aspects of the disclosure, the additional segmentation method extracts square sub-images (128×128) where the target candidates are located and applies an expectation maximization algorithm with automatic setting of the initial conditions to refine the bright and shadow blobs. Setting the initial conditions for the expectation maximization is optionally performed for at least one of the following reasons:

1) using the techniques described in the Papson reference, many chips (sub-images) may not be segmented correctly and may look like the examples shown in FIGS. 24A-24C; and, 2) the expectation maximization algorithm takes significantly more time without initial conditions, for example, it could be 40-60 sec vs 1 sec or less when the initial conditions are preset.

Figure 25A:
FIGS. 25A-25C show segmentation of the SAR image of FIGS. 24A-24C according to aspects of the present disclosure.
Figure 25B:
Figure 25C:
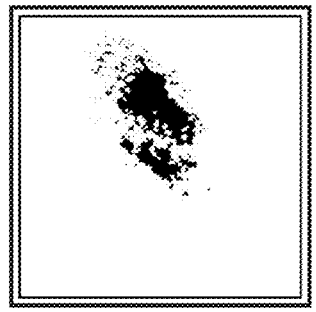

An exemplary result of fine segmentation (2208) of the same chip shown in FIGS. 24A-24C with a modified expectation maximization algorithm according to aspects of the disclosure is shown in FIGS. 25A-25C. The more refined results shown in FIGS. 25A-25C are more suitable for further shape classification/processing.

Figure 26:
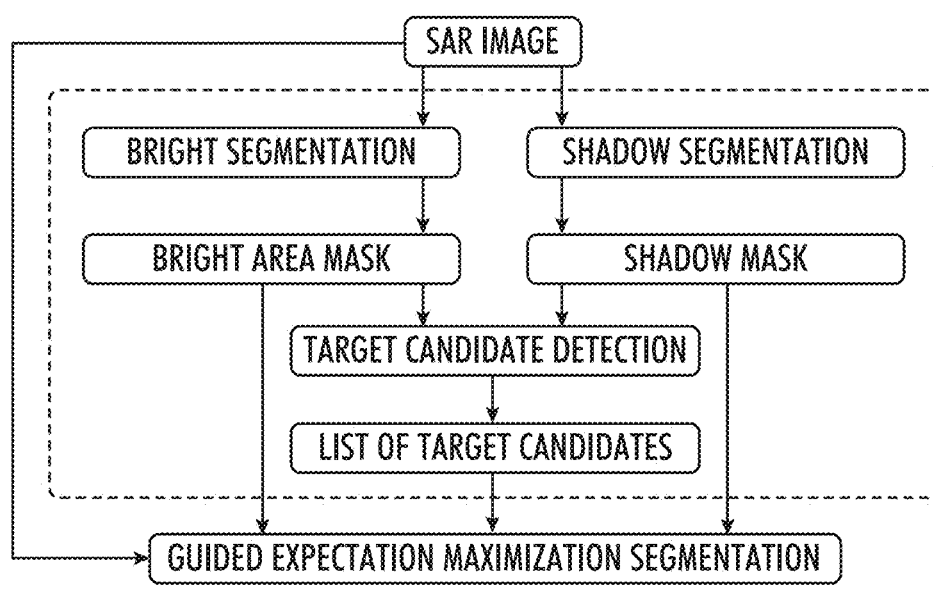
FIG. 26 is a flowchart of a coarse SAR segmentation process according to aspects of the present disclosure.

FIG. 26 is a flowchart of a coarse SAR segmentation (2206) process according to aspects of the present disclosure. It shows how the coarse segmentation process (2206) is applied to the entire SAR image 2104 to identify potential targets or target candidates within the entire SAR image 2104. In an aspect of the disclosure, this process (2206) finds locations of possible targets. After that the sub-images (chips) are extracted for each target location, and into both masks: bright and shadow areas.

Figure 27:
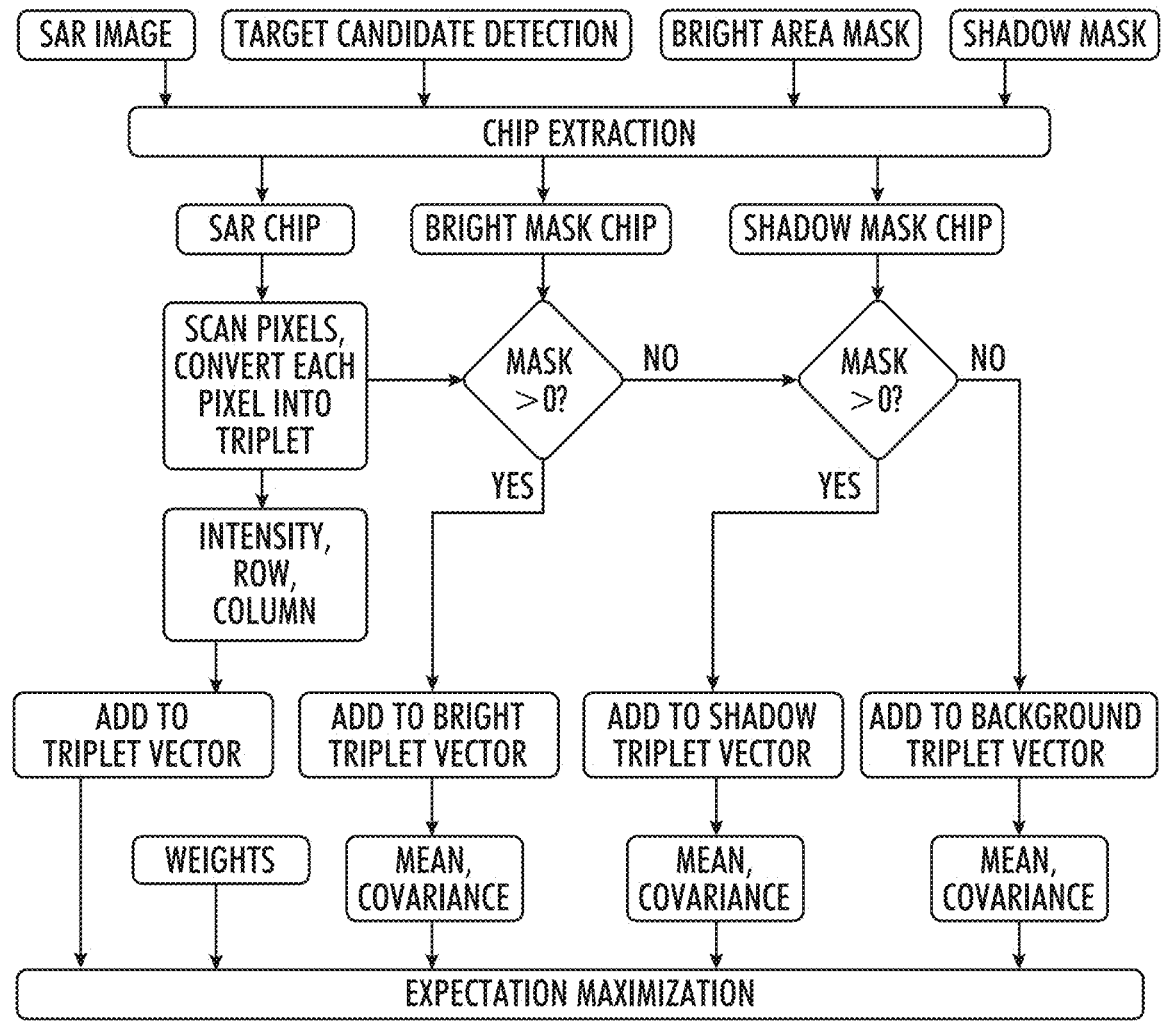
FIG. 27 is a flowchart of a fine SAR segmentation process according to aspects of the present disclosure.
Figure 28A:
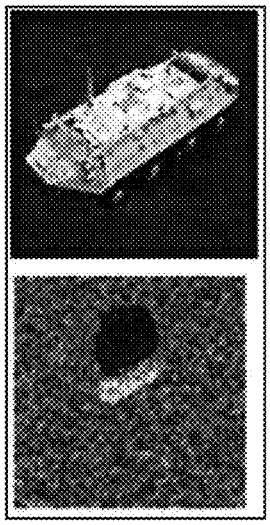
FIGS. 28A-28E show examples of smoothing shadow masks for different targets according to aspects of the present disclosure.
Figure 28B:
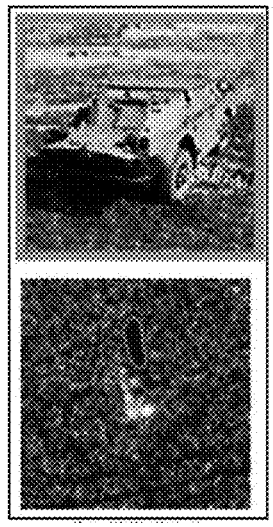
Figure 28C:
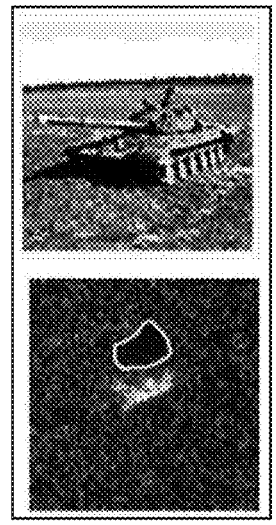
Figure 28D:
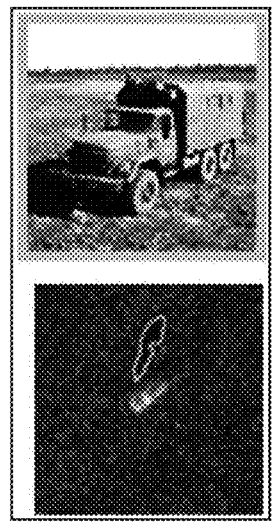
Figure 28E:

FIG. 27 is a flowchart of a fine SAR segmentation (2208) process according to aspects of the present disclosure. The coarse segmentation process (2206) is shown in FIG. 26. Bright area and shadow area masks created during coarse segmentation (2206) are optionally further processed using fine segmentation (2208) where the fine segmentation is applied to at least one chip or sub-image. In some aspects, pixels of the SAR chip are converted into triplets containing the intensity, row and column locations of the pixel. After that, the corresponding locations on the bright and shadow mask are analyzed. If the bright mask value at the pixel location is greater than zero the triplet is added to bright triplet vector, if the shadow value of the mask is greater than zero the triplet is added to shadow triplet vector, if both mask values are zero, the triplet is added to the background triplet vector. In some aspects, the weight module contains three counts, initially set to zero. Each count counts the number of triplets added to the corresponding vector. These counts will be used to initialize the values of weight matrix. In some aspects of the disclosure, when all pixels are processed the mean and covariance for all three vectors of triplets is found. The weights, means and covariance matrices are used as inputs to the expectation maximization algorithm. After the training is complete, the algorithm produces the labels for each triplet of training vector. This information can be represented as set of the image masks shown in FIGS. 25A-25C: bright area mask (FIG. 25A), shadow mask (FIG. 25B), and background mask (FIG. 25C).

In some aspects, the raw bright mask and raw shadow mask can be smoothed with a convolving or morphological filter, for example to obtain smoother representation of it. Examples of smoothing of the shadow masks are shown in FIGS. 28A-28E, taken from the "Modeling of Target Shadows for SAR Image Classification" paper, for different types of targets.

Figure 29A:
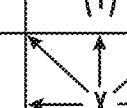
FIGS. 29A-29B show chain code formation for a contour according to aspects of the present disclosure.
Figure 29B:
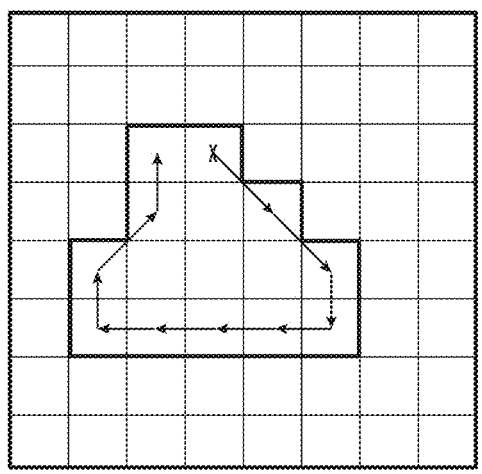

The classification process is the last step applied to compare (2214) the shapes of the real SAR bright areas and shadows with predicted bright areas and shadow areas to find the closest match or to reject the real SAR target candidate as an Unknown Object or non-target. In some aspects of the disclosure, the real SAR image target candidate is represented as two blobs: bright and shadow. The shape of these two blobs is compared to the shapes of the blobs generated from the synthetic SAR images of the potential targets from the database 2110. In some aspects, the blobs (bright and shadow) are converted into sequences of chain codes, such as shown in FIGS. 29A-29B, taken from the "Modeling of Target Shadows for SAR Image Classification" paper, that are processed by the classifier 2116. The sequence of the chain codes represents the shape of the blob. Each comparison of the shapes of the target candidate with the shapes of the blobs extracted from synthetic SAR images of the model produces a score. The heist score defines the classification output in form of the model label corresponding to this score. If the heist score is below certain threshold the candidate is classified as "no-match".

In some aspects, the chain codes are compared using histogram methods or Hidden Markov Models. The two shapes generated from a real SAR image are compared to the bank of shapes obtained from synthetic images produced by the SAR regression renderer 2112. The methods described herein have an advantage over known methodologies at least for the reason that the methods described herein use the shape of both bright and dark blobs. The outputs of two classifiers are optionally combined as a linear sum to produce a single classifier value. If the classifier output is below a certain threshold the object is classified as Unknown Class, otherwise it is labeled as the closest one from the objects in the list of CAD models used to generate synthetic images.

In some aspects, potential targets classified as unknowns are reprocessed when additional SAR data is available, for example the real SAR target candidate may be more easily identified at a different grazing and/or aspect angle than the original comparison. In some aspects, already labelled or classified targets are reprocessed for classification/label verification.

Maritime SAR ATR Aspect

Methodologies described herein can be applied to ATR for maritime targets, like ships, that usually do not produce shadows in SAR images due to the electro-magnetic properties of water. In an aspect, SAR regression is applied along the cross range direction.

Figure 30:
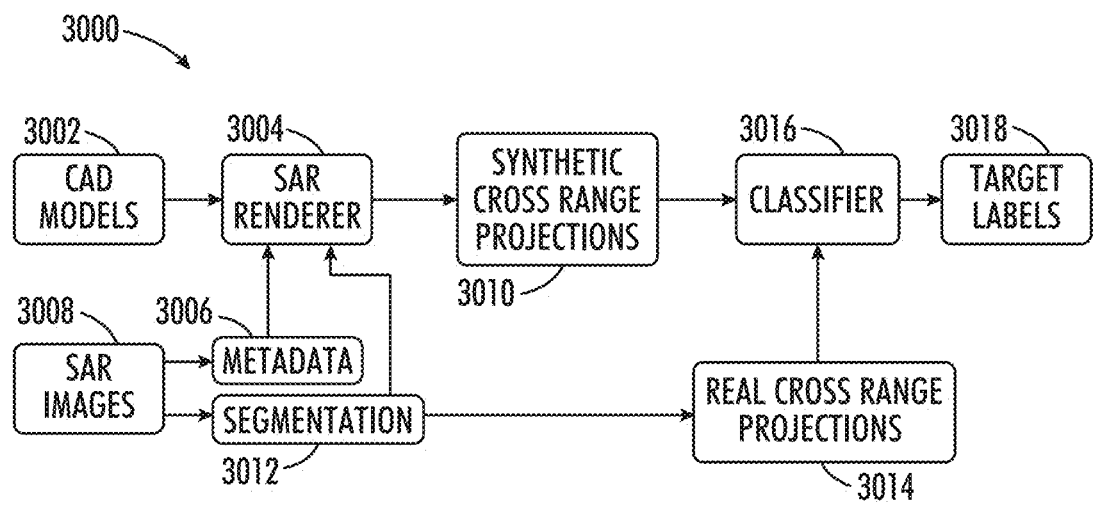
FIG. 30 is a block diagram showing a maritime-based SAR automatic target recognition system according to aspects of the present disclosure.
Figure 31:
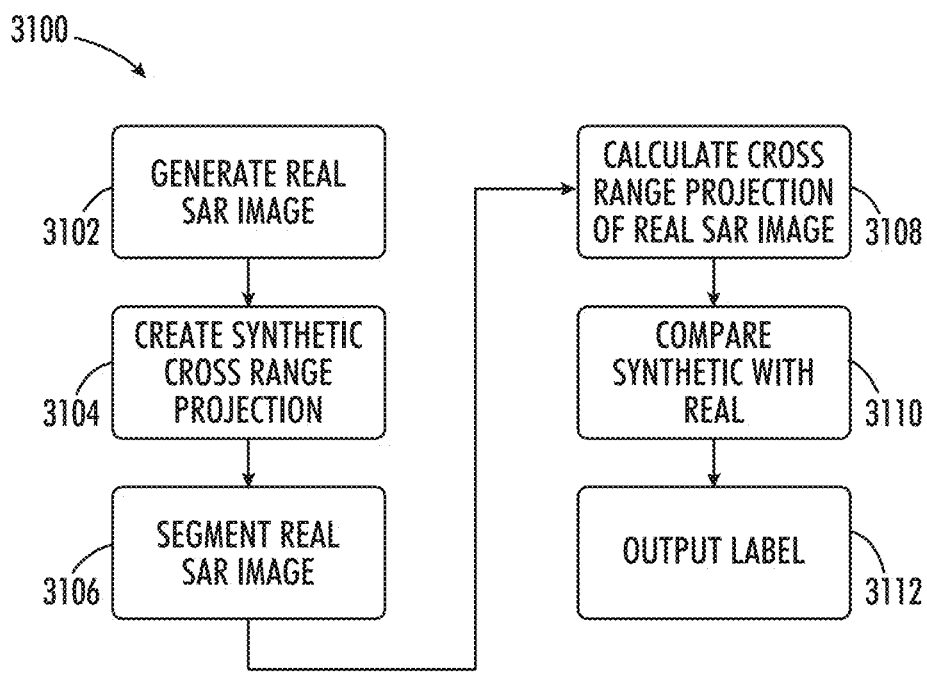
FIG. 31 is a flowchart of a maritime-based automatic target recognition in SAR data process according to an aspect of the present disclosure.

FIG. 30 is a block diagram showing a maritime-based SAR automatic target recognition system 3000 according to aspects of the present disclosure. For efficiency, the system 3000 will be described in conjunction with the flowchart 3100 of FIG. 31, which shows a process for using the system 3000 to perform ATR in SAR data using the shadow and bright segmentation. Some of the individual components of system 3000 are described in more detail below, after the introduction of the system 3000 as a whole. While not shown in FIG. 30, the system 3000 is provided with internal and/or external communications capability, wherein the various modules within the system 3000 are configured to communicate with each other and/or external entities. It should be understood that not each function and/or component described with respect to system 3000 has to be separate from some or all of the others. That is, some or all of these components and/or functions could be combined into fewer components or one physical component. Further, actions shown in the flowchart 3100 do not necessarily have to be performed serially, some actions can be performed in parallel.

In an aspect of the disclosure, the system 3000 is provided with a database 3002 containing at least one CAD model of a target of interest, for example a ship. A modified SAR regression renderer 3004 creates (3104) a predicted cross range projection 3010 of the SAR image of the CAD model target using specified metadata 3006 taken from the real SAR image 3008 information (e.g. aspect angle and/or grazing angle and/or geolocation) generated (3102) by a SAR. In an aspect of the disclosure, two possible combinations of aspect angles: one for $\alpha$ and one for $\alpha+\pi$ are used to cover ambiguity in aspect angle estimation of the target candidate.

In some aspects, a segmentation module 3012 segments (3106) the real SAR image of the potential target into a binary mask and determines possible aspect angles $\alpha$ and $\alpha+\pi$ for the renderer. In some aspects, the segmentation (3106) is performed the same way as it was described above for the non-maritime targets, using two classes instead of three. A cross range projection module 3014 calculates (3108) cross range projection of SAR data. In some aspects, a classifier module 3016 compares (3110) real SAR cross range projection with two synthetic cross range projections for each CAD model and finds the closest CAD model based on the comparison. If the difference between two projections is below a specified threshold (i.e. the difference is "small", within the set limits) the classifier 3016 will output (3112) the corresponding target label 3018 (e.g. ship class) or a "no class" or "unknown" label. In some aspects, potential targets classified as unknowns are reprocessed when additional SAR data is available, for example the real SAR target candidate may be more easily identified at a different grazing and/or aspect angle (but processing in the cross-range direction) than the original comparison. In some aspects, already labelled or classified targets are reprocessed for classification/label verification.

Figure 32:
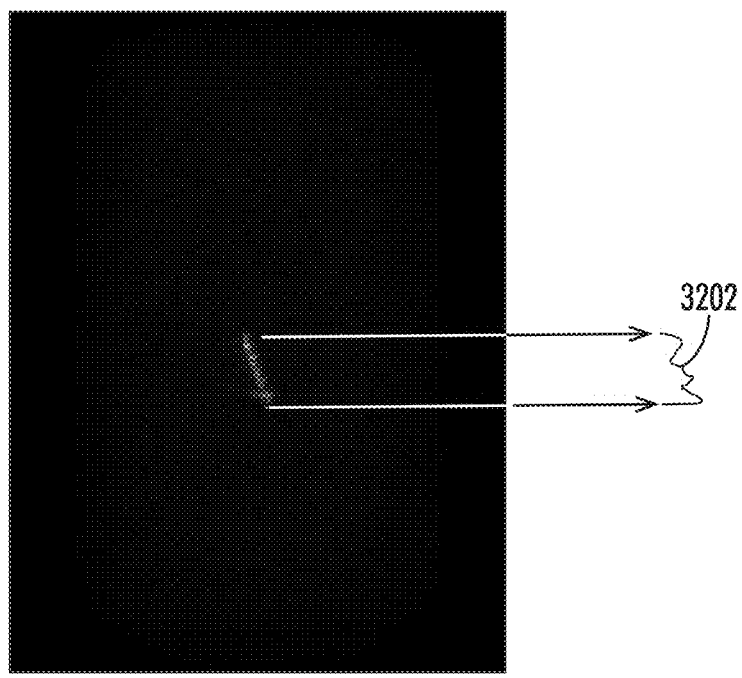
FIG. 32 is a SAR image with shift and blurriness in a cross range direction.

There several contributing factors that affect quality of SAR of maritime objects: Possible cross range shift of SAR data of maritime targets may make it difficult to compare (3110) bright parts of the target with synthetic SAR image. This shift may occur because of target motion. When maritime target is moving the SAR image can be blurred especially in cross range direction. A SAR image with the shift and blurriness in cross range direction is shown in FIG. 32. In order to reduce the impact of these factors, cross range projection 3202 is used for classification since it is more robust. The projection crates a vector of values where each value is the sum of pixel values along cross range direction. In this case the representation of the target is cross range shift invariant.

Figure 33A:
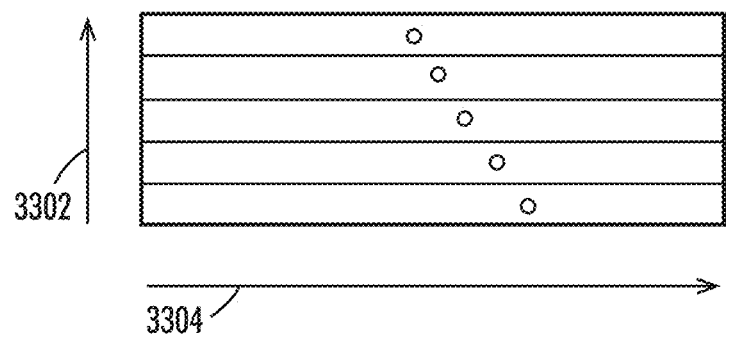
FIG. 33A-33B is a schematic illustration of cross range shift in SAR data.
Figure 33B:
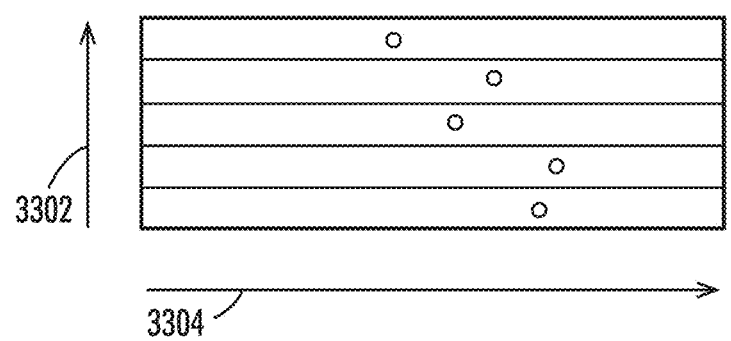

Another illustration of the cross range shift is shown in FIGS. 33A-33B. The bright edge in FIG. 33A can look like points shown in FIG. 33B due to this shifting phenomenon. The range direction is the vertical axis 3302 and the cross range direction is the horizontal axis 3304 in FIGS. 33A-33B.

Figure 34A:
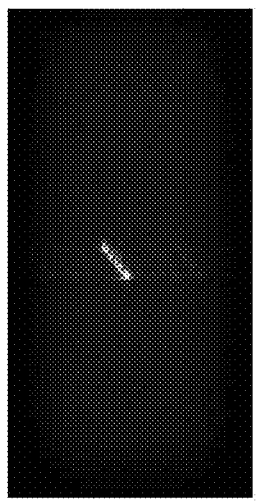
FIGS. 34A-34C show segmentation of a maritime SAR image according to aspects of the present disclosure.
Figure 34B:
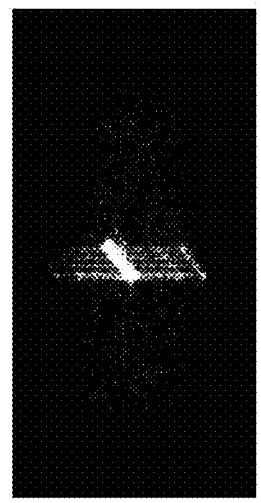
Figure 34C:
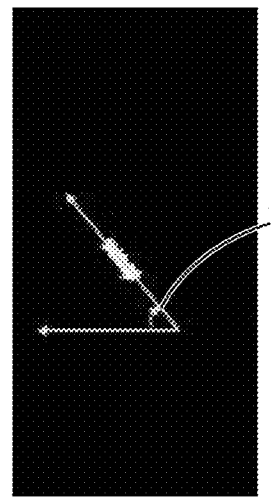

In an aspect of the disclosure, the segmentation process of a maritime target from SAR data is shown in FIGS. 34A-34C. The original SAR image (FIG. 34A) is segmented (3106) and converted into binary image (FIG. 34B) which is processed with morphological operations to obtain the binary mask of the target (FIG. 34C). In an aspect, the binary mask is used to determine aspect angle of the target plus and minus 180 degrees and to calculate (3108) the cross range projection of the target. The aspect angle 3402 is found with principal component analysis applied to the binary mask of the target. The binary mask can be used for selecting pixels used in cross range projection.

Figure 35A:
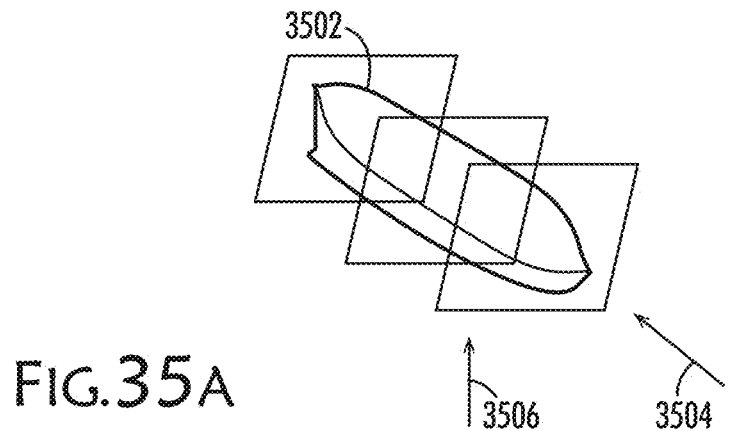
FIGS. 35A-35B are schematic views of regression rendering for a maritime target according to aspects of the present disclosure; and, FIGS. 36A-36B are schematic views showing a comparison of a real and two synthetic SAR projections of a potential maritime target according to aspects of the present disclosure.
Figure 35B:
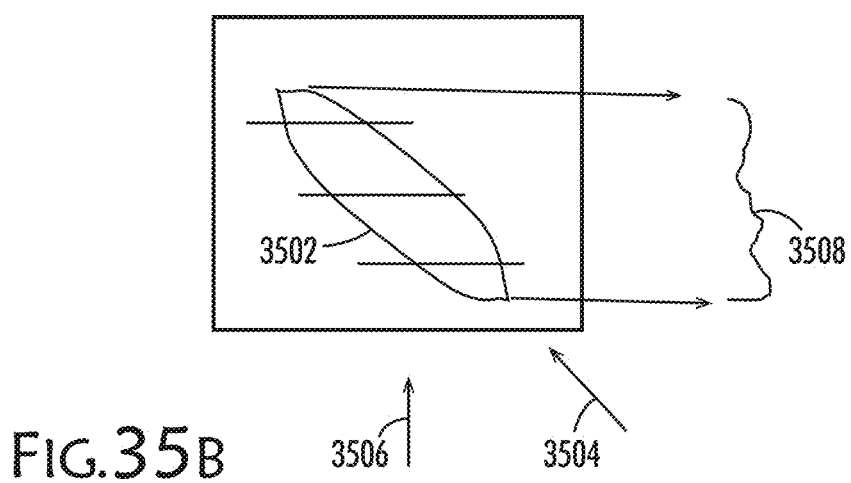

In an aspect of the disclosure, the operation of SAR regression renderer 3004 is shown in FIGS. 35A-35B. FIG. 35A shows a general view of the model 3502 and wave front 3504 propagation. A top view of the model 3502 is shown in FIG. 35B. The wave front 3504 is positioned perpendicular to the radar range 3506 direction and it is shifted along main axis of the ship model. Each position of the wave front is used in the same way as it's described above for the ground targets but the output 3508 of the regression is the projection along cross range direction.

Figure 36A:
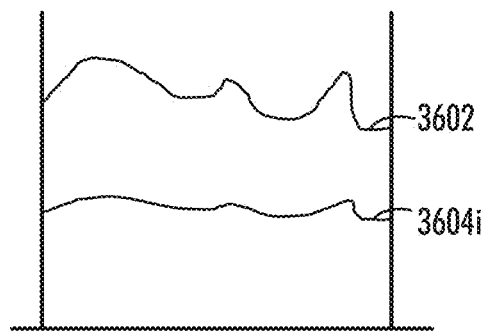
Figure 36B:
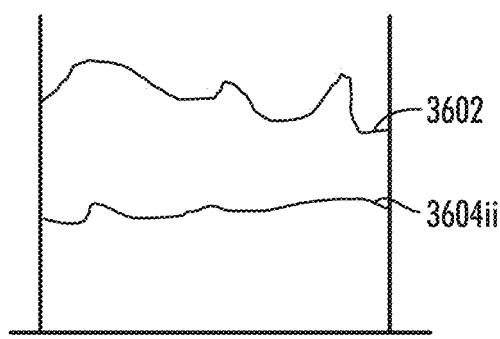

The examples of real and synthetic SAR projections are shown in FIGS. 36A and 36B. The top curve 3602 represents real SAR projection, the bottom curve is the synthetic one. The synthetic projection is generated for aspect angles α 3604i and α+π 3604ii. The results generated by the renderer may have different offset and scaling which makes it difficult to do direct comparison of the curves. In an aspect of the disclosure, the least square method is used to find the offset and scaling between real SAR projection and the synthetic one in form:

$$(x)=b*f_s(x)+a$$

where $f_r(x)$ is the real SAR projection, $f_s(x)$ is the synthetic SAR projection, x is the range coordinate, b is the scaling factor, a is the offset.

The comparison of the closeness of the curves is based on the chi-square criteria $$X^2(a, b) = \sum_{i=1}^{N}\left(\frac{f_r(x_i) - a - bf_s(x_i)}{\sigma_i}\right)$$

where $x_i$ is the value of range at sample i, a is the offset and b the slope found using the least square method, N is the number of samples in the projection, and $\sigma_i$ is the standard deviation of the error. After the left hand value is calculated the threshold is determined by equation:

$$V_t = K*\sqrt{X^2(a,b)/N}$$

where K is a constant found empirically.

The comparison is performed for both synthetic projections and the minimal value is used to generate the classification output if it's below the threshold. Since the curves may not align correctly due to different factors the comparison above should be performed for different shifts of the one curve relative to the other to find the best match.

The classifier 3016 will produce the correct ship label when the difference between real and predicted projections is small or "no class" otherwise.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various aspects or features may be presented in a range format. It should be understood that the description in range format is merely for convenience and brevity and should not be construed as an inflexible limitation on the scope of the application. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the application, which are, for clarity, described in the context of separate aspects, may also be provided in combination in a single aspect. Conversely, various features of the application, which are, for brevity, described in the context of a single aspect, may also be provided separately or in any suitable subcombination or as suitable in any other described aspect of the application. Certain features described in the context of various aspects are not to be considered essential features of those aspects, unless the aspect is inoperative without those elements.

Although specific aspects are described in the application, it is evident that many alternatives, modifications and variations will be apparent to those skilled in the art. Accordingly, it is intended to embrace all such alternatives, modifications and variations that fall within the spirit and broad scope of the appended claims.

Citation or identification of any reference in this application shall not be construed as an admission that such reference is available as prior art to the present application, however, to the extent that any citation or reference in this application does not contradict what is stated herein, it is incorporated by reference. To the extent that section headings are used, they should not be construed as necessarily limiting.

The variations and alternatives of the present disclosure relate to, but are not limited to, components and parts designed to be positioned on the exterior or interior of objects including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, bombs, ballistic etc. and therefore include manned and unmanned aircraft, spacecraft, terrestrial, non-terrestrial, and even surface and sub-surface water-borne vehicles and objects.

What is claimed is:

1. A method for automatic target recognition in synthetic aperture radar (SAR) data, comprising:
   capturing a real SAR image of a potential target at a real aspect angle and a real grazing angle;
   generating a synthetic SAR image of the potential target by inputting, from a potential target database, at least one three-dimensional potential target model at the real aspect angle and the real grazing angle into a SAR regression renderer; and,
   classifying the potential target with a target label by comparing only a far edge of at least one shadow area of the synthetic SAR image with a corresponding far edge of at least one shadow area of the real SAR image using a processor.

2. A method according to claim 1, further comprising segmenting the synthetic SAR image and the real SAR image before classifying the potential target with a target label.

3. A method according to claim 2, wherein:
the synthetic SAR image is segmented into the at least one shadow area of the synthetic SAR image, and
the real SAR image is segmented into the at least one shadow area of the real SAR image.

4. A method according to claim 3, further comprising:
extracting the far edge of the at least one shadow area of the synthetic SAR image, and
extracting the far edge of the at least one shadow area of the real SAR image.

5. A method according to claim 3, wherein:
the synthetic SAR image is segmented into at least one bright area and the at least one shadow area, and
the real SAR image is segmented into at least one bright area and the at least one shadow area.

6. A method according to claim 1, wherein the classifying the potential target includes:
comparing, at the same aspect angles and grazing angles, a plurality of models from the potential target database to the real SAR image, and
choosing a best match from the plurality of models.

7. A method according to claim 1, wherein geolocation is used in addition to the real aspect angle and the real grazing angle in the capturing and generating.

8. A method according to claim 1, wherein the at least one three-dimensional potential target model also includes material information.

9. A method according to claim 1, wherein:
the generating the synthetic SAR image and the classifying the potential target are performed in parallel, and
the generating the synthetic SAR image is performed by a plurality of SAR regression renderers and/or the classifying the potential target is performed by processors.

10. A method according to claim 1, wherein the at least one three-dimensional potential target model is a model of at least one of a tank, an armored car, a car, a truck, an artillery piece, a vehicle, a boat, and/or combinations thereof.

11. A method according to claim 1, wherein at least one of the capturing the real SAR image, the generating the synthetic SAR image and/or the classifying the potential target are repeated for target label verification.

12. A method for automatic target recognition in maritime-derived synthetic aperture radar (SAR) data, comprising:
capturing a real cross-range projection SAR image of a potential maritime target at a real grazing angle and a real aspect angle;
generating a first synthetic cross-range projection SAR image of the potential maritime target by inputting, from a potential target database, at least one three-dimensional potential target model at the real grazing angle and the real aspect angle into a SAR regression renderer;
generating a second synthetic cross-range projection SAR image of the potential maritime target by inputting, from a potential target database, the at least one three-dimensional potential target model at the real grazing angle and a second aspect angle into the SAR regression renderer; and,
classifying the potential maritime target with a target label by comparing only a far edge of at least one shadow area of the first synthetic cross-range projection SAR image and the second synthetic cross-range projection SAR image with a corresponding far edge of at least one shadow area of the real cross-range projection SAR image using a processor.

13. A method according to claim 12, further comprising segmenting the real cross-range projection SAR image with a segmentation module.

14. A method according to claim 13, further comprising extracting a binary mask from the segmented real cross-range projection SAR image.

15. A method according to claim 14, wherein the segmentation module determines the real aspect angle and the second aspect angle from the real cross-range projection SAR image to input into the SAR regression renderer.

16. A method according to claim 12, wherein the first synthetic cross-range projection SAR image and the second synthetic cross-range projection SAR image are compared with the real cross-range projection SAR image to adjust for ambiguity of target aspect angle estimation in maritime-derived SAR data.

17. A method according to claim 12, wherein the target label includes a specific maritime target ship class.

18. A method for automatic target recognition in synthetic aperture radar (SAR) data, comprising:
capturing a real cross-range projection SAR image of a potential target at a real grazing angle and a real aspect angle;
generating a first synthetic cross-range projection SAR image of the potential target by inputting, from a potential target database, at least one three-dimensional potential target model at the real grazing angle and the real aspect angle into a SAR regression renderer;
generating a second synthetic cross-range projection SAR image of the potential target by inputting, from a potential target database, the at least one three-dimensional potential target model at the real grazing angle and a second aspect angle into the SAR regression renderer; and,
classifying the potential target with a target label by comparing only a far edge of at least one shadow area of the first synthetic cross-range projection SAR image and the second synthetic cross-range projection SAR image with a corresponding far edge of at least one shadow area of the real cross-range projection SAR image using a processor.

19. A method according to claim 18, wherein at least one of the capturing the real cross-range projection SAR image, the generating a first projection, the generating a second projection and the classifying the potential target are repeated for target label verification.

20. A system for automatic target recognition in synthetic aperture radar (SAR) data, comprising:
a SAR configured to generate a real SAR image of a potential target at a real aspect angle and a real grazing angle;
a database containing at least one three-dimensional model of a potential target;
a SAR regression renderer configured to generate a synthetic SAR image using the at least one three-dimensional model at the real aspect angle and the real grazing angle; and, a processor configured to compare only a far edge of at least one shadow area of the synthetic SAR image with a corresponding far edge of at least one shadow area of the real SAR image to classify the potential target with a target label.

21. A system according to claim 20, further comprising a segmentation module configured to segment at least a portion of at least one of the synthetic SAR image and/or the real SAR image.

22. A system according to claim 21, wherein the segmentation module is configured to:
   segment at least a portion of the synthetic SAR image into the at least one shadow area of the synthetic SAR image; and
   segment at least a portion of the real SAR image into the at least one shadow area of the real SAR image.

23. A system according to claim 22, further comprising a module for:
   extracting the far edge of the shadow area for the synthetic SAR image; and
   extracting the far edge of the shadow area for the real SAR image.

24. A system according to claim 22, wherein the segmentation module is further configured to:
   segment at least a portion of the synthetic SAR image into a bright area of the synthetic SAR image; and
   segment at least a portion of the real SAR image into a bright area of the real SAR image.

25. A system according to claim 20, wherein:
   the SAR regression renderer is configured to generate a plurality of synthetic SAR images using a plurality of three-dimensional model, and
   the plurality of synthetic SAR image are compared to the real SAR image.

26. A system according to claim 25, further comprising a best match analysis module configured to analyze the comparison of the plurality of synthetic SAR images to the real SAR image to identify one of the plurality of synthetic SAR images as a best match to the real SAR image.

27. A system according to claim 20, wherein the SAR is configured to communicate geolocation to the system.

28. A system according to claim 20, wherein the at least one three-dimensional model of the potential target includes material information.

29. A system for automatic target recognition in synthetic aperture radar (SAR) data, comprising:
   a platform;
   a SAR mounted on the platform and configured to generate a real SAR image of a potential target at a real aspect angle and a real grazing angle;
   a database containing at least one three dimensional model of a potential target;
   a SAR regression renderer configured to generate a synthetic SAR image using the at least one three dimensional model at the real aspect angle and the real grazing angle; and,
   a processor configured to compare only a far edge of at least one shadow area of the synthetic SAR image with a corresponding far edge of at least one shadow area of the real SAR image to classify the potential target with a target label.

30. A system according to claim 29, wherein the platform is selected from the group consisting of: a manned aircraft; an unmanned aircraft; a manned spacecraft; an unmanned spacecraft; a manned rotorcraft; an unmanned rotorcraft; an ordnance; and/or combinations thereof.

* * * * *